United States Patent
Asada et al.

(10) Patent No.: US 6,659,352 B1
(45) Date of Patent: Dec. 9, 2003

(54) SEMICONDUCTOR INTEGRATED CIRCUIT, A CONTACTLESS INFORMATION MEDIUM HAVING THE SEMICONDUCTOR INTEGRATED CIRCUIT, AND A METHOD OF DRIVING THE SEMICONDUCTOR INTEGRATED CIRCUIT

(75) Inventors: Hiroaki Asada, Takatsuki (JP); Joji Nakane, Nara (JP); Tatsumi Sumi, Takatsuki (JP); Taketoshi Matsuura, Takatsuki (JP); Atsuo Inoue, Kyoto-fu (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 28 days.

(21) Appl. No.: 09/584,542

(22) Filed: May 31, 2000

(30) Foreign Application Priority Data

Jun. 2, 1999 (JP) .......................... 11-155009
Aug. 18, 1999 (JP) .......................... 11-231110

(51) Int. Cl.$^7$ .............................................. G06K 19/06
(52) U.S. Cl. ....................................... 235/492; 235/487
(58) Field of Search .................................. 235/492, 487

(56) References Cited

U.S. PATENT DOCUMENTS 5,479,172 A    12/1995   Smith et al.
5,698,838 A *  12/1997   Yamaguchi ............... 235/492
5,815,355 A     9/1998   Dawes
6,173,899 B1 *  1/2001   Rozin ....................... 235/492

FOREIGN PATENT DOCUMENTS

WO        WO 96 28879       9/1996

* cited by examiner

Primary Examiner—Harold I. Pitts

(57) ABSTRACT

A semiconductor integrated circuit which obtains a driving power from a carrier onto which data has been piggybacked, the semiconductor integrated circuit being characterized by demodulating data by correctly discriminating it even when the obtained power supply voltage has become overvoltage, and characterized by effectively using the power supplied by the carrier. The semiconductor integrated circuit includes: a two-voltage rectifier circuit as a power source circuit 111; a voltage regulator circuit 112 which exercises a control so that a power with a higher voltage (VDDH) used for demodulating data does not exceed a certain voltage value; a resistor 141; and a capacitor 142. With this construction, the voltage input to a regulator circuit 1121 as the reference voltage changes in correspondence to the change in voltage VDDH which is caused by the change in amplitude.

17 Claims, 16 Drawing Sheets

FIG. 7A
ALTERNATING VOLTAGE (VB-VA) AT BOTH ENDS OF ANTENNA COIL

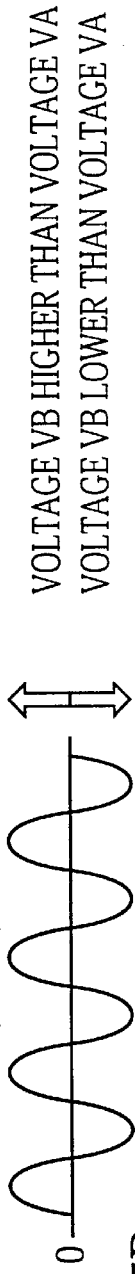

VOLTAGE VB HIGHER THAN VOLTAGE VA
⇐⇒
VOLTAGE VB LOWER THAN VOLTAGE VA

FIG. 7B
VOLTAGES GENERATED BY TWO-VOLTAGE RECTIFIER CIRCUIT: A VOLTAGE GENERATED BETWEEN VDDH OUTPUT TERMINAL AND VDDL OUTPUT TERMINAL; AND A VOLTAGE GENERATED BETWEEN VDDL OUTPUT TERMINAL AND GROUND.

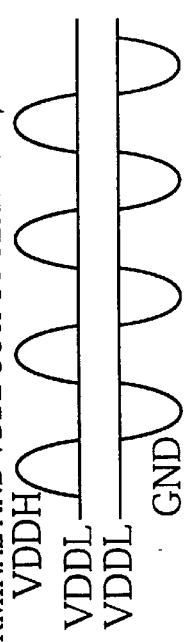

VDDH
VDDL
VDDL
GND

FIG. 7C
VOLTAGE IS SMOOTHED BY CAPACITANCE FOR SMOOTHING

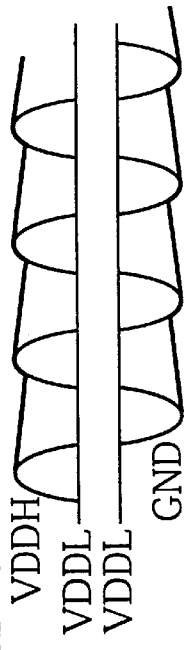

VDDH
VDDL
VDDL
GND

FIG. 7D
DIRECT VOLTAGE IS GENERATED: BETWEEN VDDH OUTPUT TERMINAL AND VDDL OUTPUT TERMINAL; AND BETWEEN VDDL OUTPUT TERMINAL AND GROUND.

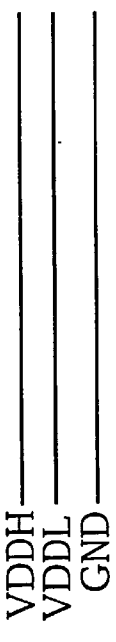

VDDH
VDDL
GND

FIG. 9A
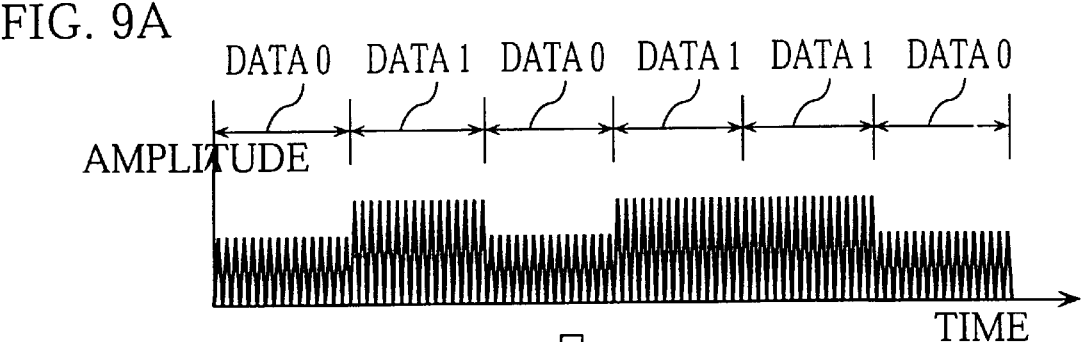
FIG. 9B ⇩ SMOOTHING
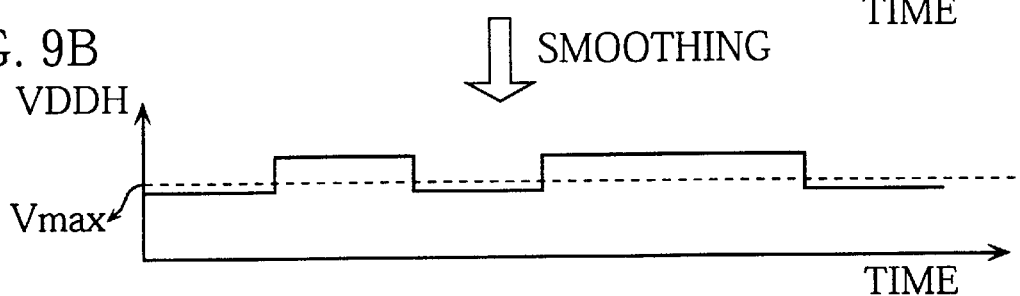
FIG. 9C ⇩ REGULATOR CIRCUIT
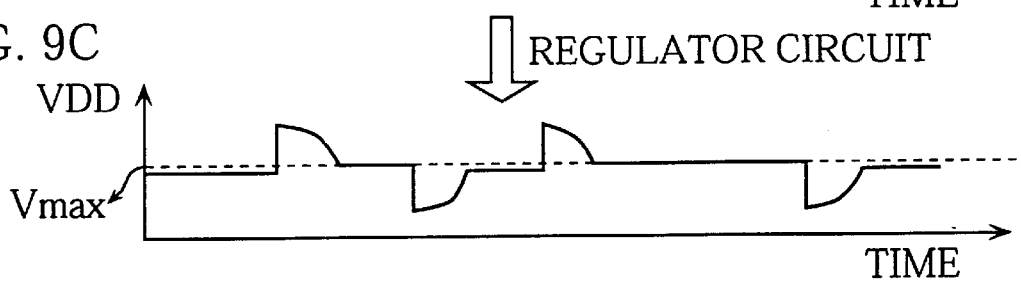
⇩ DIFFERENTIATING CIRCUIT
FIG. 9D
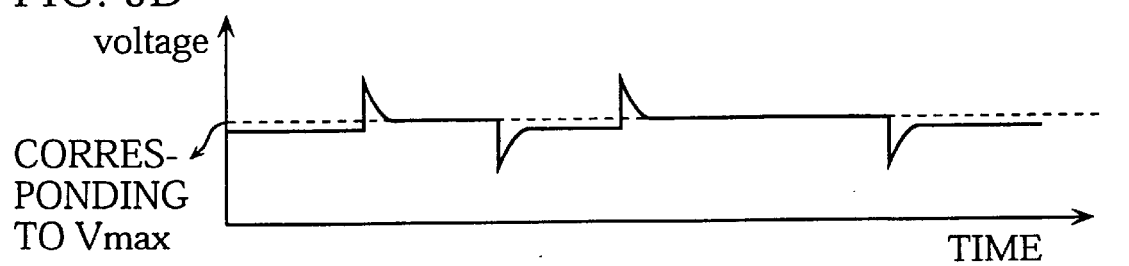

SEMICONDUCTOR INTEGRATED CIRCUIT, A CONTACTLESS INFORMATION MEDIUM HAVING THE SEMICONDUCTOR INTEGRATED CIRCUIT, AND A METHOD OF DRIVING THE SEMICONDUCTOR INTEGRATED CIRCUIT

This application is based on an application No. 2000-53785 filed in Japan, the content of which is hereby incorporated by reference.

BACKGROUND OF THE INVENTION

(1) Field of the Invention

The present invention relates to a semiconductor integrated circuit, a contactless information medium having the semiconductor integrated circuit, and a method for driving the semiconductor integrated circuit.

(2) Description of Related Art

Recently, contactless information mediums such as IC cards have been in practical use, where in the contactless information mediums, the mutual induction of the coil is used for data transfer and the power supply in the form of a radio wave having a certain wave length. The IC cards are classified broadly into the proximity type, the vicinity type and the like according to the distance between the IC card and a reader/writer with which they can communicate with each other. The standards are currently prepared for each type.

The proximity IC cards, which can be used at a distance from the reader/writers of approximately 1 cm to 20 cm, especially have a possibility of having a very broad range of uses. For example, people having an IC card as a season ticket can pass through the ticket collecting gate without taking out the card from the card case since the gate is opened or closed by communication between the IC card and the reader/writer in a contactless state.

However, for the IC cards to have a broad range of uses, it is important that the IC cards are compact and lightweight. In addition, it is expected that the wider range of uses the IC cards have, the more roughly the cards are handled. Therefore, taking into consideration the protection from such rough handling, it is a general rule that the contactless information mediums such as IC cards have a semiconductor integrated circuit containing a complicated circuit.

Now, the construction of a typical contactless IC card having a semiconductor integrated circuit will be described. FIG. 1 is a block diagram showing the construction of a typical contactless IC card. Note that FIG. 1 shows a reader/writer 990 which transmits/receives radio waves to/from an IC card 900, as well as the IC card 900. The following are description of the construction and operation of the IC card 900.

The IC card 900 includes an antenna coil 981 which is used to transmit/receive radio waves to/from an antenna coil 991 connected to the reader/writer 990. An alternating voltage is generated at both ends of the antenna coil 981 when the antenna coil 981 receives a radio wave from the antenna coil 991, and the generated alternating voltage is input into a semiconductor integrated circuit 910 contained in the IC card 900. 982 in the drawing indicates a capacitor for tuning.

The antenna coil 981 for reception is typically connected to the semiconductor integrated circuit 910 of the IC card 900. The capacitor 982 for tuning is often connected to the semiconductor integrated circuit 910 of the IC card 900, but in some cases it is placed in the semiconductor integrated circuit 910.

The IC card 900 receives ASK(Amplitude Shift Keying)-modulated signals from the reader/writer 990 and obtains power for driving the semiconductor integrated circuit 910 from the received signals, and also obtains data transferred from the reader/writer 990. FIG. 2 shows a specific example of the construction of the carrier wave transmitted from the reader/writer 990. As shown in the drawing, the parts having small amplitude in the ASK-modulated carrier represent data 0, and the parts having large amplitude data 1.

The semiconductor integrated circuit 910 includes a power supply circuit 911, a first regulator circuit 912, a modulation/demodulation circuit 913, a logic circuit 914, a nonvolatile memory 915, a step-down circuit 916, and a second regulator circuit 917. Note that the step-down circuit 916 may be replaced with a step-up circuit for a reason to be described later.

FIG. 3 shows the internal construction of the power supply circuit 911. As shown in the drawings, in the conventional IC card 900, a general all-wave rectifier circuit 9111 and a capacitor 9112 for smoothing constitute the power supply circuit 911. With this construction, an alternating voltage generated at both ends of the antenna coil 981 is rectified to become a direct voltage VCC. The rectified current is then regulated by the first regulator circuit 912 not to exceed a certain voltage value, and the regulated current is used as a voltage to drive the modulation/demodulation circuit 913 or the memory 915. The rectified current is also stepped down by the step-down circuit 916 and regulated by the second regulator circuit 917 not to exceed a certain voltage value, and the regulated current is used as a voltage to drive the logic circuit 914.

Though not shown in FIG. 1, the current having passed through the first regulator circuit 912 supplies a driving power to analog circuits such as a clock generator circuit. Here, the clock generator circuit generates a clock signal from the alternating voltage generated at both ends of the antenna coil 981, the clock signal being used for operating the logic circuit 914 and the nonvolatile memory 915.

Generally, digital circuits such as the logic circuit 914 are driven by a relatively low voltage (approximately 2V to 3V), while a voltage higher than this need to be supplied to the nonvolatile memory 915. For example, FeRAM requires approximately 3V to 7V of voltage, and EEPROM requires approximately 10V of voltage (for writing or erasing). To deal with this, in the conventional contactless IC card 900, the voltage generated by the power supply circuit 911 is stepped down by the step-down circuit 916 then supplied to the logic circuit 914. Alternatively, a low voltage for driving the logic circuit 914 may be generated by the power supply circuit 911, then the generated voltage may be stepped up by a step-up circuit to be used for driving analog circuits (such as the modulation/ demodulation circuit 913 and the clock generator circuit) and the nonvolatile memory 915.

As shown in FIG. 2, the data transferred between the IC card 900 and the reader/writer 990 is piggybacked onto the carrier wave. The data received by the contactless IC card 900 from the reader/writer 990 is demodulated by the modulation/ demodulation circuit 913; and the data to be transmitted from the contactless IC card 900 to the reader/writer 990 is modulated by the modulation/demodulation circuit 913. The data transferred between the contactless IC card 900 and the reader/writer 990 is controlled by the logic circuit 914 and stored in the nonvolatile memory 915.

Meanwhile, in the contactless IC card 900 in which the mutual induction of the coil is used to supply power and transmit/receive data, the power supply voltage generated by the power supply circuit 911 changes depending on the distance between the reader/writer 990 (power supply source) and the contactless IC card 900. A very short distance between them in particular may generate an overvoltage and destroy the internal circuits of the contactless IC card 900. To prevent such a failure, the first and second regulator circuits 912 and 917 are provided to regulate the power supply voltage generated by the power supply circuit 911 not to exceed a certain voltage value.

FIG. 4 shows the construction of a circuit conventionally used as the first regulator circuit 912. First and second P-channel MOS transistors (hereinafter referred to as PchMOS transistors) 931 and 932 are connected in series between the output from the power supply circuit 911 (represented as "VCC" in the drawing) and the ground. The gate and the drain of the first PchMOS transistor 931 are directly connected to each other, and the source of the first PchMOS transistor 931 is connected to VCC.

The drain of the first PchMOS transistor 931 is connected to the source of the second PchMOS transistor 932. The gate and the drain of the second PchMOS transistor 932 are connected to the output of a reference voltage generating circuit 933 and the ground, respectively. A node placed between the first and second PchMOS transistors 931 and 932 is connected to the base of a first PNP-type bipolar transistor 934. The collector of the first PNP-type bipolar transistor 934 is connected to the ground, and the emitter of the first PNP-type bipolar transistor 934 is connected to VCC via a resistor 935. The emitter of the first PNP-type bipolar transistor 934 is also connected to the base of a second PNP-type bipolar transistor 936, and the collector of the second PNP-type bipolar transistor 936 is connected to the ground. The emitter of the second PNP-type bipolar transistor 936 is output as a power supply (represented as VDD in the drawing) to the modulation/demodulation circuit 913 or the nonvolatile memory 915.

Now, the operation of the first regulator circuit 912 will be described. When it supposed that the threshold voltage at the second PchMOS transistors 932 of the first regulator circuit 912 is represented as VGS, that the voltage between the base and the emitter of the first PNP-type bipolar transistor 934 is represented as VBE1, that the voltage between the base and the emitter of the second PNP-type bipolar transistor 936 is represented as VBE2, and that the reference voltage generated by the reference voltage generating circuit 933 is represented as "Vref", then when the voltage VCC output from the power supply circuit 911 exceeds a value (Vref+VGS+VBE1+VBE2), the PNP-type bipolar transistors are tuned ON to decrease the voltage VDD output from the regulator circuit to (Vref+VGS+VBE1+VBE2). Hereinafter, a provisional maximum value (Vref+VGS+VBE1+VBE2) of the output voltage VDD regulated by the first regulator circuit 912 is represented as "Vmax". The details of the maximum voltage control are as follows.

The output of the reference voltage generating circuit 933 is input into the gate of the second PchMOS transistors 932. As a result, the gate voltage is Vref. When it is supposed that the threshold value of the second PchMOS transistors 932 is represented as VGS, the source voltage of the second PchMOS transistors 932 is (Vref+VGS). When the source voltage exceeds this value, the second PchMOS transistors 932 is tuned ON to decrease the source voltage to (Vref+VGS). On the other hand, when the source voltage of the second PchMOS transistors 932 is less than (Vref+VGS), the second PchMOS transistors 932 is tuned OFF and the current does not flow, and the source voltage is increased to (Vref+VGS) by the current sent from the drain of the first PchMOS transistors 931. As a result, in either cases, the source voltage of the second PchMOS transistors 932 becomes (Vref+VGS) eventually.

Now, the operation of the first PchMOS transistors 931 will be described. As described above, the drain of the first PchMOS transistor 931 is connected to the source of the second PchMOS transistor 932, and the gate and the drain of the first PchMOS transistor 931 are connected to each other. Since the source voltage of the second PchMOS transistor 932 is (Vref+VGS), the gate voltage of the first PchMOS transistor 931 is (Vref+VGS). When it is supposed that the threshold voltage of the first PchMOS transistor 931 is represented as VGS2, the first PchMOS+ transistor 931 is turned ON when the voltage VCC exceeds (Vref+VGS+VGS2).

Now, the operation of the first PNP-type bipolar transistor 934 will be described. As described earlier, the base voltage of the first PNP-type bipolar transistor 934 is (Vref+VGS). Since the emitter and the base of the first PNP-type bipolar transistor 934 is connected with the pn junction method, to pass the current through the area between the emitter and the base, the base-emitter voltage VBE1 is required to be higher than the forward voltage of the diode.

Accordingly, when the current is passing through the first PNP-type bipolar transistor 934, the emitter voltage is (Vref+VGS+VBE1).

The second PNP-type bipolar transistor 936 will be described. The emitter of the first PNP-type bipolar transistor 934 is connected to the base of the second PNP-type bipolar transistor 936. Accordingly, the base voltage of the second PNP-type bipolar transistor 936 is (Vref +VGS +VBE1). Here, when the base-emitter voltage of the second PNP-type bipolar transistor 936 is represented as VBE2, the emitter voltage of the second PNP-type bipolar transistor 936 is the Vmax (=Vref+VGS+VBE1+VBE2) considering in the same way as the first PNP-type bipolar transistor 934.

When the emitter voltage exceeds Vmax, the second PNP-type bipolar transistor 936 is turned ON and decreases the emitter voltage to Vmax. The emitter of the second PNP-type bipolar transistor 936 is the output from the first regulator circuit 912, and is also the source VDD supplied to the modulation/demodulation circuit 913 and the like. That is to say, the voltage VDD is regulated not to exceed Vmax.

When the voltage VCC supplied from the power supply circuit 911 is lower than Vmax, the second PNP-type bipolar transistor 936 is not turned ON. Therefore, the first regulator circuit 912 does not operate. The voltage VDD output from the first regulator circuit 912 becomes the same as the voltage VCC supplied from the power supply circuit 911.

As described earlier, when an ASK-modulated carrier is used for transferring data between the reader 990 and the contactless IC card 900, data 0 and 1 are defined in accordance with the level of the amplitude. The parts of the carrier having great amplitude are regarded as data 1 and the parts having small amplitude are regarded as data 0. As shown in FIG. 2, the parts of the carrier corresponding to data 0 actually have a certain level of amplitude, instead of having no amplitude. This arrangement is made for fear of failing to drive the contactless IC card 900 which is caused when the carrier is not sent due to succession of data 0 and the power supply voltage (VCC or VDD) is not generated.

Here, when the size of the small amplitude is close to the size corresponding to Vmax, the voltage VCC exceeds Vmax when the amplitude becomes large. This drives the first regulator circuit 912 and decreases the voltage VDD to Vmax. Accordingly, the difference between the voltage VDDs supplied to the modulation/demodulation circuit 913 when data is 0 and when data is 1 becomes smaller.

Whether the received data signal is 0 or 1 is judged when the modulation/demodulation circuit 913 demodulates the VDD. Therefore, when the difference between the voltage values corresponding to data 0 and data 1 becomes small, there is a possibility that the modulation/demodulation circuit 913 cannot judge the difference between data 0 and data 1, and a possibility that a malfunction might be caused when there is a noise in the signal.

Furthermore, when the size of the small amplitude is larger than the size corresponding to Vmax, the first regulator circuit 912 is always driven. When this happens, it is impossible to differentiate data 0 from data 1 from the VDD value after the signal has passed through the first regulator circuit 912.

In other words, when the distance between the reader/writer 990 and the contactless IC card 900 is too short, the voltage VDD corresponding to data 0 becomes high enough to make the discrimination between data 0 and data 1 difficult. When this happens, the data transmitted from the reader/writer 990 cannot be discriminated and cannot be written to the nonvolatile memory 915.

As described above, there is a problem that the data cannot be discriminated when the distance between the reader/writer 990 and the contactless IC card 900 is too short. However, in the contactless IC card which supplies electric power through an ASK-modulated radio waves, malfunctions that may be caused when the distance is too long need to be prevented.

In the above-described power supply circuit 911, the voltage generated by the all-wave rectifier circuit is step down by the step-down circuit, or step up by the step-up circuit so that a voltage to be supplied to the analog circuits or nonvolatile memory 915 and a voltage to be supplied to the logic circuit 914 are generated. However, there is another problem. With the above-described conventional method, the electricity supplied through radio waves cannot be fully used and the distance between the reader/writer 990 and the contactless IC card 900 with which the card can be used is short.

SUMMARY OF THE INVENTION

It is therefore the first object of the present invention to provide a semiconductor integrated circuit which supplies voltages with which discrimination between data 0 and data 1 is possible even in a circumstance in which the regulator regulates voltages so that the voltage of the data signal received by the modulation/demodulation circuit does not exceed a certain value.

It is the second object of the present invention to provide a semiconductor integrated circuit which effectively uses the power supplied from the reader/writer 990 and enables the contactless IC card 900 to communicate with the reader/writer 990 with a longer distance between them than conventional techniques.

The first object is fulfilled by a semiconductor integrated circuit comprising: a rectifier circuit which rectifies AC power to DC power; a regulator circuit which includes an input terminal for receiving the DC power, an output terminal, and a control terminal for receiving a reference voltage, and exercises control so that a voltage output from the output terminal does not exceed a voltage value determined from the reference voltage received by the control terminal; and a reference voltage changing circuit which changes the reference voltage received by the control terminal in correspondence to voltage change of the DC power.

With the above construction, the reference voltage input to the control terminal of the regulator circuit is changed in correspondence to the change in the voltage of the direct-current power rectified by the rectifier circuit. As a result, when the semiconductor integrated circuit is installed on a contactless information medium such as an IC card, it is possible to discriminate, from the output voltage, the changes of the data piggybacked onto the carrier even if the power supplied from the carrier has become overvoltage.

The second object is fulfilled by a contactless information medium comprising: a power generation circuit which receives an ASK-modulated carrier from outside the contactless information medium and generates AC power; a rectifier circuit which rectifies the AC power generated by the power generation circuit to DC power; a reference voltage generation circuit which outputs a reference voltage; a regulator circuit which includes an input terminal for receiving the DC power, a control terminal, and an output terminal, regulates the DC power so as not to exceed a voltage value determined from a voltage value received by the control terminal, and outputs the regulated DC power from the output terminal; and a reference voltage changing circuit which changes the reference voltage in correspondence to voltage change of the DC power, the changed reference being input to the control terminal.

With the above construction, the two-voltage rectifier circuit outputs two direct-current powers with different voltage values in parallel. This improves, for example, the use efficiency of the driving power supplied by the carrier. Therefore, the contactless information medium operates with more stability than conventional techniques even when the power supply source is distant from it, resulting in a longer distance between itself and a reader/writer, than conventional techniques, with which they can communicate with each other.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 7A to 7D show the operation principle of the power supply circuit 111 using the two-voltage rectifier circuit;

FIGS. 9A to 9D show the operation of the voltage regulator circuit 112 in Embodiment 1;

DESCRIPTION OF THE PREFERRED EMBODIMENTS

Figure 1:
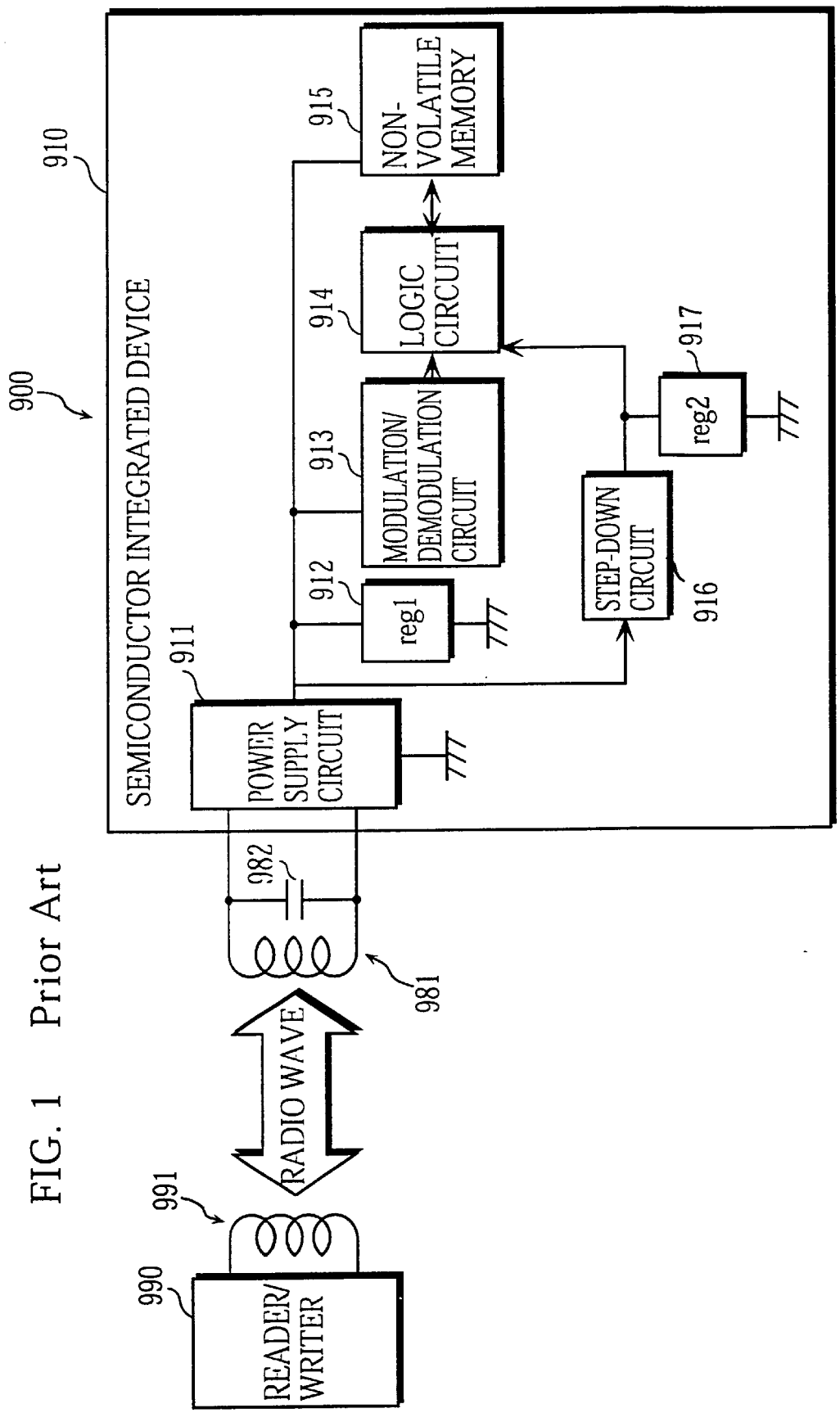
FIG. 1 is a block diagram showing the construction of a conventional, typical contactless IC card.
Figure 2:
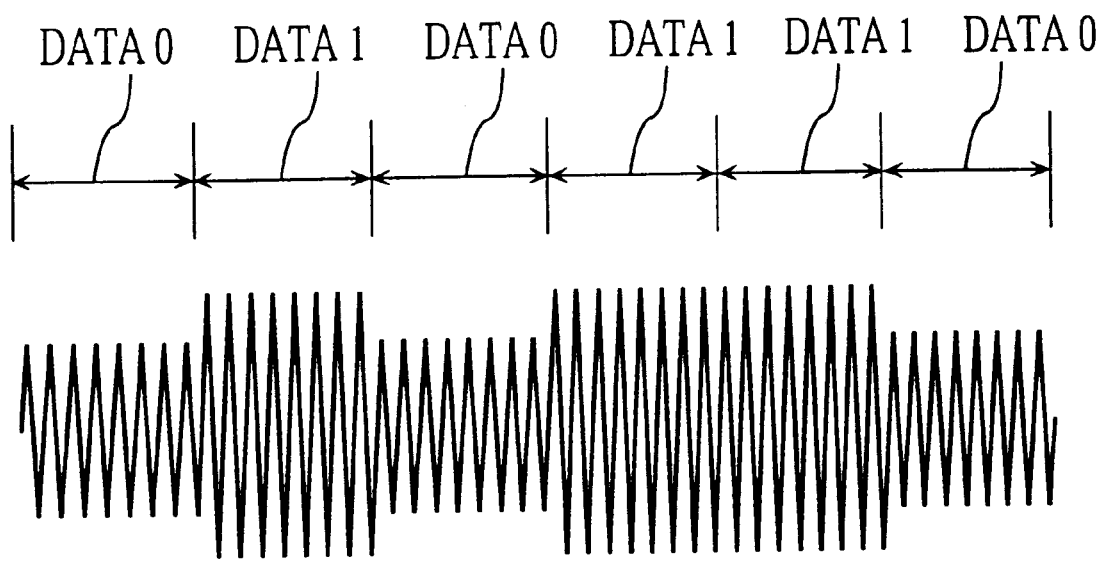
FIG. 2 shows a specific example of the construction of the carrier wave transmitted from the reader/writer 990.
Figure 3:
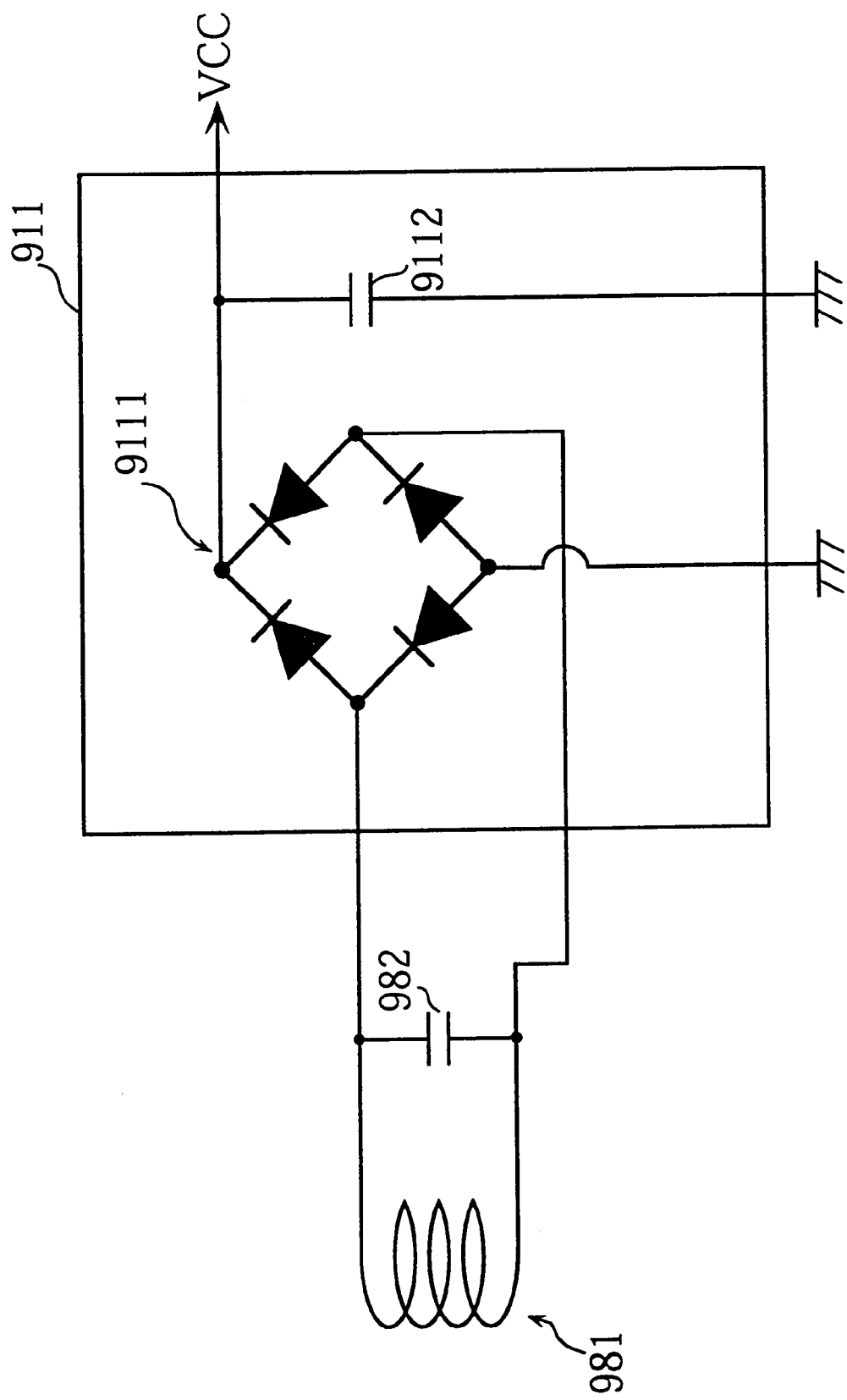
FIG. 3 shows an example of the internal construction of the power supply circuit 911 in a conventional technique.
Figure 4:
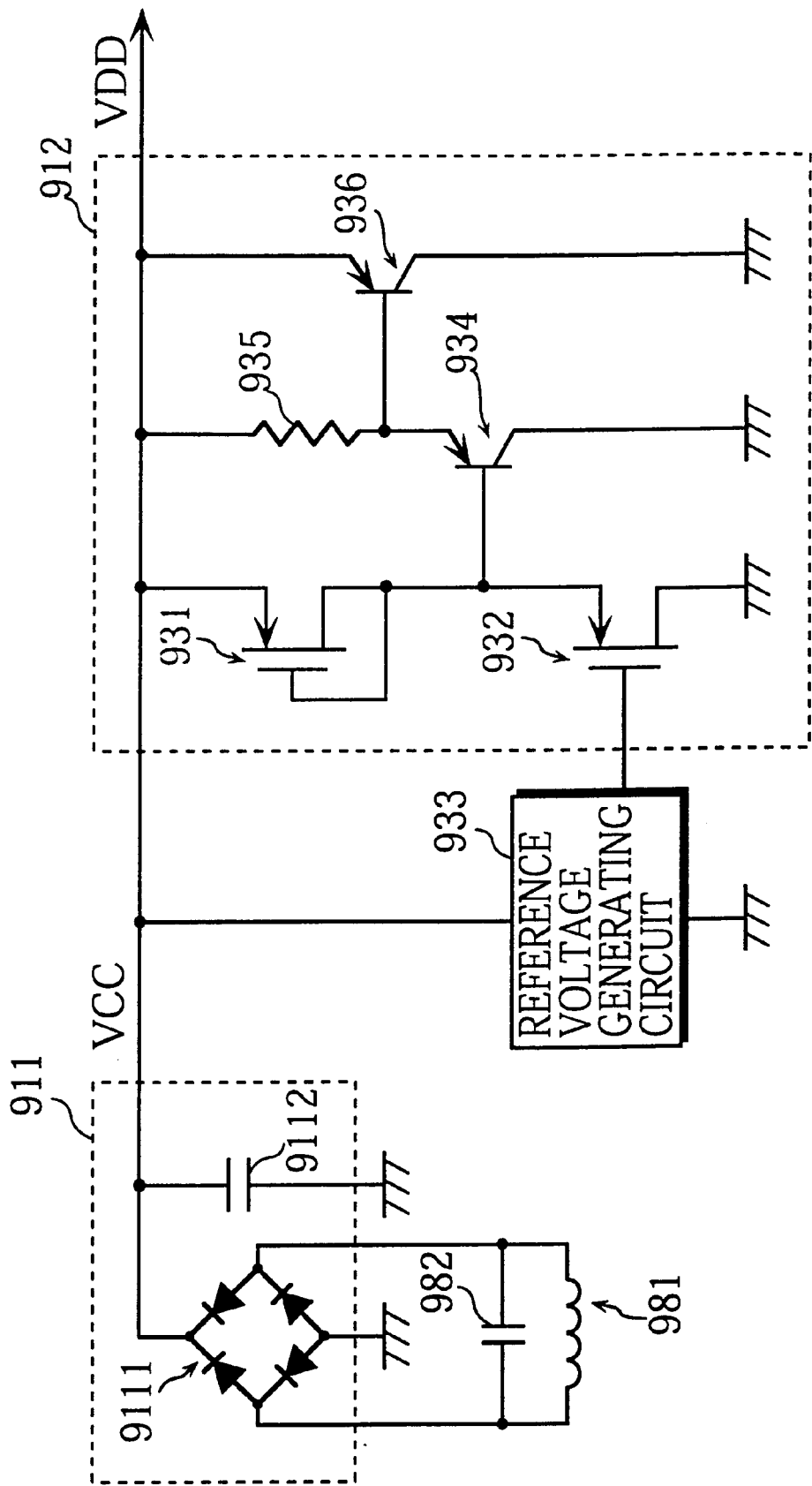
FIG. 4 shows the construction of a circuit conventionally used as the first regulator circuit 912.

The present invention, the semiconductor integrated circuit and the contactless information medium having the semiconductor integrated circuit, will be described through specific embodiments thereof by way of referring to the drawings.

<Embodiment 1>

The first embodiment of the present invention will be described. In the present embodiment, a contactless IC card having the semiconductor integrated circuit will be used as an example of the contactless information medium having the semiconductor integrated circuit.

(1) Overall Construction of Contactless IC Card 100

Figure 5:
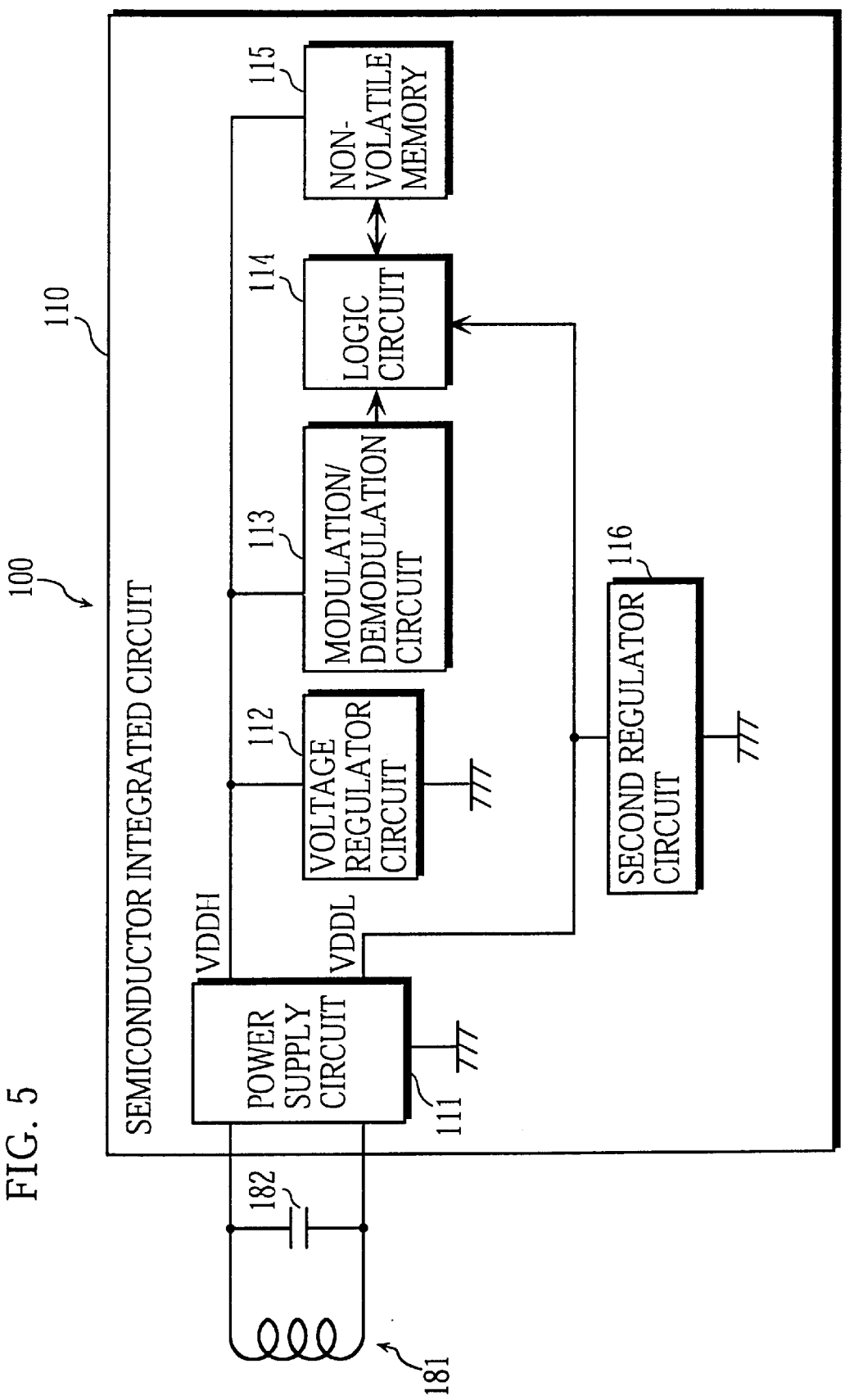
FIG. 5 is a block diagram showing the overall construction of the contactless IC card 100 in Embodiment 1.

FIG. 5 is a block diagram showing the overall construction of a contactless IC card 100 in Embodiment 1.

As shown in FIG. 5, the contactless IC card 100 of the present embodiment includes a semiconductor integrated circuit 110. The semiconductor integrated circuit 110 includes a power supply circuit 111, a voltage regulator circuit 112, a modulation/demodulation circuit 113, a logic circuit 114, a nonvolatile memory 115, and a second regulator circuit 116. As in the above-described conventional technique, the contactless IC card 100 includes analog circuits such as a clock generator circuit, as well as the modulation/demodulation circuit 113 though such analog circuits are not shown in the drawing.

An antenna coil 181 connected to the power supply circuit 111, a capacitor 182 for tuning, the logic circuit 114, and the nonvolatile memory 115 are the same as the conventional technique, and will not described in detail here. Now, the power supply circuit 111, the voltage regulator circuit 112 and the like will be described in detail.

Figure 6:
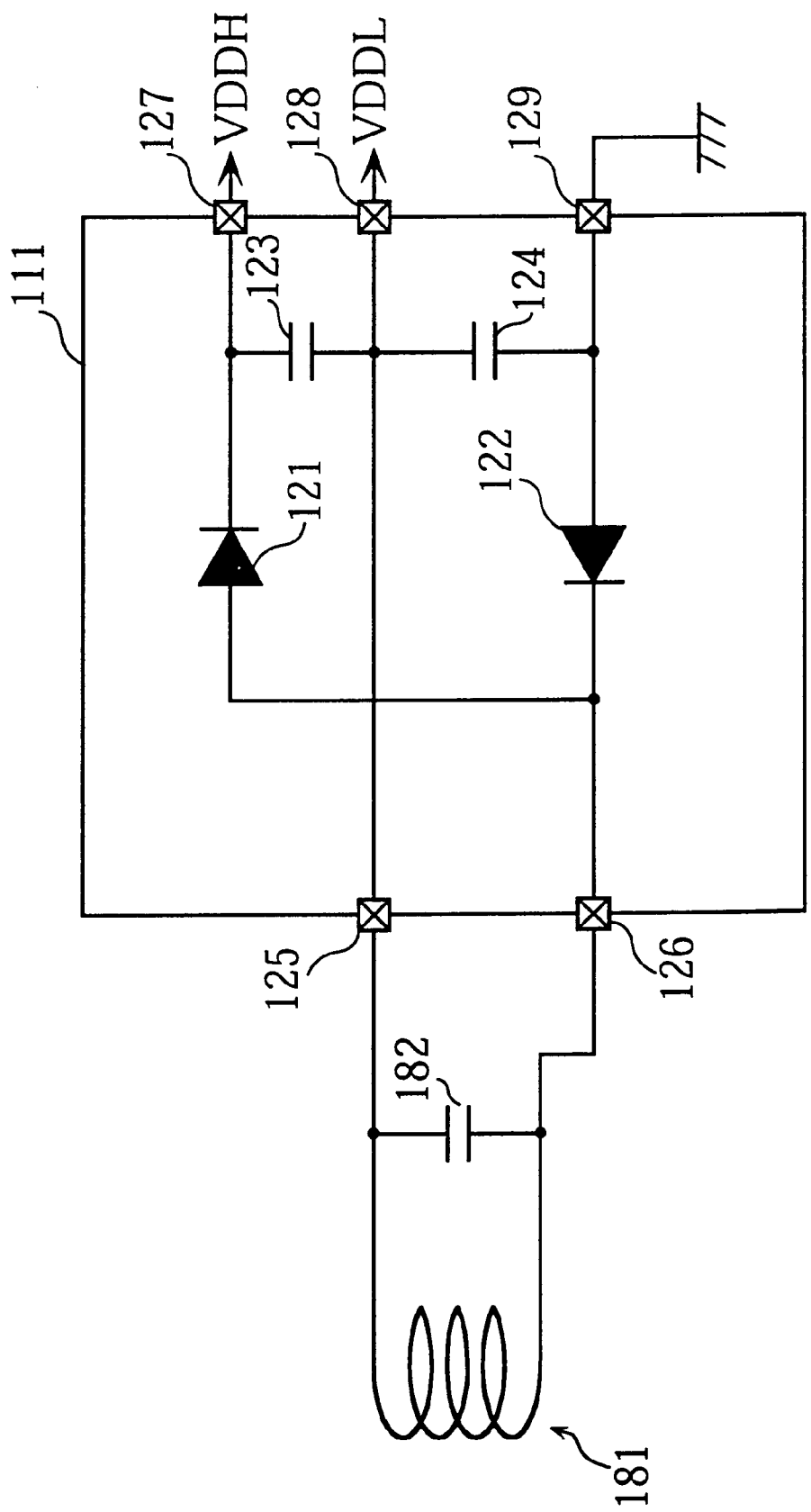
FIG. 6 shows the construction of the power supply circuit 111 in Embodiment 1.

FIG. 6 shows the construction of the power supply circuit 111. As shown in FIG. 6, the power supply circuit 111 has a two-voltage rectifier circuit which can separately generate: a voltage VDDL of approximately 2V to 4V which is supplied from the alternating voltage generated at both ends of the antenna coil 181 to the logic circuit 114; and a voltage VDDH of approximately 4V to 8V which is supplied from the alternating voltage to the nonvolatile memory 115 or the analog circuits such as the modulation/demodulation circuit 113.

The power supply circuit 111 includes diodes 121 and 122 for rectification and capacitors 123 and 124 for smoothing. A terminal 125 is connected to a junction between the capacitors 123 and 124. A terminal 126 is connected to the anode of the diode 121 and to the cathode of the diode 122. The cathode of the diode 121 is connected to a terminal of the capacitor 123 and also connected to a VDDH output terminal 127. The anode of the diode 122 is connected to a terminal of the capacitor 124 and also connected to a terminal 129 which is connected to the ground. A junction between the capacitors 123 and 124 is connected to a VDDL output terminal 128.

The operation principle of the power supply circuit 111 will be described with reference to FIGS. 7A to 7D. First, when the antenna coil 181 receives a radio wave from a reader/writer not shown in the drawing, an alternating voltage (VB−VA) is generated at both ends of the antenna coil 181 as shown in FIG. 7A, where VA represents a voltage at the terminal 125, and VB a voltage at the terminal 126. When the voltage VB is higher than the voltage VA, the current flows in the order of terminal 126→diode 121→capacitor 123→terminal 125. In this case, a voltage shown in FIG. 7B is generated between the VDDH output terminal 127 and the VDDL output terminal 128. As mentioned earlier, the VDDH output terminal 127 is an output terminal which supplies power to the analog circuits, the nonvolatile memory 115 or the like.

When the voltage VB is lower than the voltage VA, the current flows in the order of terminal 125→capacitor 124→diode 122→terminal 126. In this case also, a voltage shown in FIG. 7B is generated between the terminal 129 connected to the ground and the VDDL output terminal 128. As mentioned earlier, the VDDL output terminal 128 is an output terminal which supplies a voltage to the logical circuit 114. As shown in FIG. 7C, the voltage generated between the VDDH output terminal 127 and the VDDL output terminal 128 is smoothed by the capacitor 123. Also, the voltage generated between the terminal 129 and the VDDL output terminal 128 is smoothed by the capacitor 124. As a result of this, a direct voltage is generated between the VDDH output terminal 127 and the VDDL output terminal 128, and between the terminal 129 and the VDDL output terminal 128. The two voltages are approximately equal to each other.

Here, the voltage at the VDDH output terminal 127 is approximately twice the voltage at the VDDL output terminal 128 with reference to the terminal 129. The VDDH output terminal 127 supplies the generated voltage to the modulation/demodulation circuit 113, the nonvolatile memory 115 and the like in the semiconductor integrated circuit 110. The VDDL output terminal 128 supplies the generated voltage to the logical circuit 114 in the semiconductor integrated circuit 110. This drives the whole contactless IC card 100. The nonvolatile memory 115, which is driven by a relatively high voltage (approximately 4V) receives a power supply from the VDDH output terminal 127. The logic circuit 114, which is driven by a relatively low voltage (approximately 2V) receives a power supply from the VDDL output terminal 128. Analog circuits such as the modulation/demodulation circuit 113 and the clock generator circuit may receive a power supply from the VDDL output terminal 128 if the specifications of the contactless IC card 100 allow it.

As described earlier, in the present embodiment, the power supply circuit 111 has a two-voltage rectifier circuit. Here, to differentiate the data sent from the reader/writer and write the data into the nonvolatile memory 115, the output from the VDDH output terminal 127 need to be input into the modulation/demodulation 113. Here if the conventional regulator circuit as described above is connected to regulate the voltage supplied from the VDDH output terminal 127 not to exceed a certain voltage value, then the data may not be differentiated when the distance between the reader/writer and the contactless IC card 100 is too short. In the present embodiment, the contactless IC card 100 is provided with the voltage regulator circuit 112 which is made by adding a certain circuit to the conventional regulator circuit. By having the voltage regulator circuit 112, it is possible to substantially regulate the voltage supplied from the VDDH output terminal 127 not to exceed a certain voltage value, and at the same time, it is possible to detect the change of data being sent from the reader/writer from 0 to 1, or from 1 to 0. The following are detailed description of the voltage regulator circuit 112 in the present embodiment.

Figure 8:
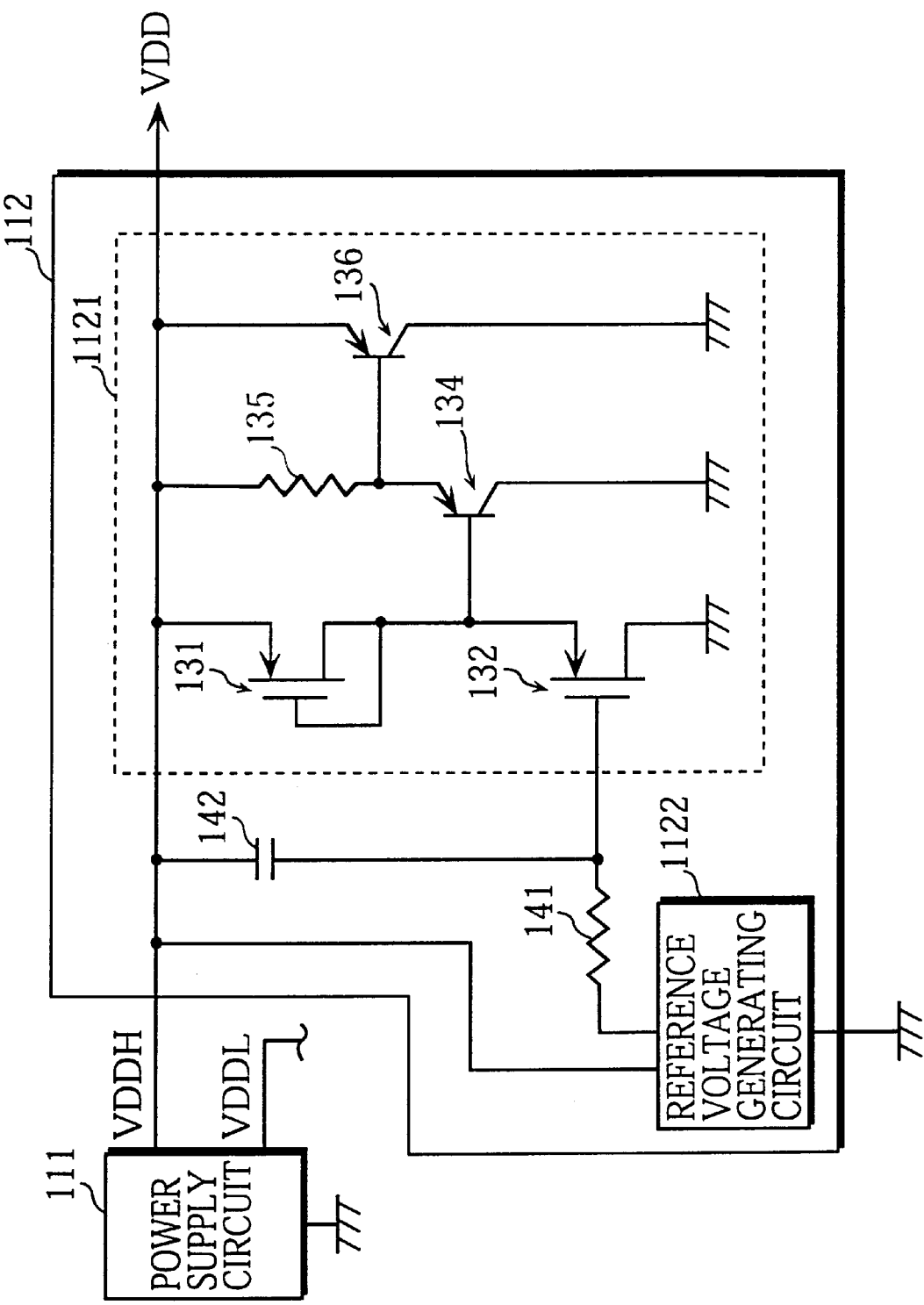
FIG. 8 shows the construction of the voltage regulator circuit 112 in Embodiment 1.

FIG. 8 shows the construction of the voltage regulator circuit 112 in the present embodiment. In FIG. 8, a first regulator circuit 1121 of the voltage regulator circuit 112 is provided to prevent a problem from occurring when the voltage VDDH, which is input to the modulation/demodulation circuit 113 to differentiate between data 0 and data 1, exceeds the maximum rated voltage of a circuit to be driven. The first regulator circuit 1121 and a reference voltage generating circuit 1122 operate in the same way as the above-described conventional technique. These circuits therefore will not be detailed here.

In the voltage regulator circuit 112 of the present embodiment: a resistor 141 is disposed between the gate of a second PchMOS transistor 132 and the output of the reference voltage generating circuit 1122; and a capacitor 142 is disposed between a terminal of the resistor 141 on a side of the second PchMOS transistor 132 and the output of the VDDH output terminal of the power supply circuit 111. The operation of the resistor 141 and the capacitor 142 makes it possible to detect the change of the received data from 0 to 1 or from 1 to 0 even if the voltage VDDH supplied from the power supply circuit 111 exceeds the maximum voltage value (Vmax) for a case in which the first regulator circuit 1121 has regulated the voltage value.

Now, the operation of the voltage regulator circuit 112 will be described. The description will deal with a case in which the voltage VDDH supplied from the power supply circuit 111 is sufficiently high. More specifically, the description will deal with a case in which the voltage VDDH exceeds Vmax at least when the received data is 1 (having higher amplitude). The reason is as follows. When the voltage VDDH is not sufficiently high, the first regulator circuit 1121 is not driven. Therefore, the voltage VDDH is not decreased by the first regulator circuit 1121 when the received data is 1. As a result, in this case, there is no difficulty in particular in differentiating between data 0 and data 1.

It should be noted here that when the voltage VDDH supplied from the power supply circuit 111 is lower than Vmax (=Vref+VGS+VBE1+VBE1), a second PNP-type bipolar transistor 136 does not turn ON. In this case, the voltage VDD is equal to the voltage VDDH supplied from the power supply circuit 111.

First, the operation of the capacitor 142, which is one of the characteristics of the power regulator circuit 112 of the present embodiment, will be described. The capacitor 142 does not operate when the power supply voltage VDDH supplied from the power supply circuit 111 is stable. The operation of the capacitor 142 when the antenna coil 181 receives an ASK-modulated radio wave from the reader/writer will be described with reference to FIGS. 9A to 9D. The ASK-modulated signal has a waveform shown in FIG. 9A. The signal is regulated and smoothed while passing through the power supply circuit 111 and has a waveform shown in FIG. 9B. This is the waveform of VDDH. Note that in the drawing, the dotted line represents Vmax. Here, suppose that the low parts of the waveform represents data 0 and the high parts represents data 1. It can be noticed then that the power supply voltage drastically increases when data changes from 0 to 1. Here, the amount of increase of the power supply voltage is represented as dV. The base of the second PchMOS transistor 132 is connected to VDDH via the capacitor 142. As a result, when the voltage VDDH increases by dV due to the coupling by the capacitor 142, the base voltage of the second PchMOS transistor 132 also increases by dV.

For the first regulator circuit 1121, the above increase of the base voltage of the second PchMOS transistor 132 can be understood that the reference voltage output from the reference voltage generating circuit 1122 has increased by dV. In this case, the maximum value of voltage VDD output from the first regulator circuit 1121 is represented as Vmax+dV. The base of the second PchMOS transistor 132 is connected to the reference voltage generating circuit 1122 via the resistor 141. With this construction, the reference voltage input to the first regulator circuit 1121 is recognized as Vref+dV immediately after the data has changed from 0 to 1, but the voltage returns to Vref with time, the time taken to return from (Vref+dV) to Vref being determined by the time constant calculated from the characteristic values of the resistor 141 and the capacitor 142. The maximum value of the voltage VDD changes to Vmax in correspondence to this change of the received voltage.

It is desirable that the characteristic values of the resistence 141 and the capacitor 142 are set so that a value R*C is larger than the data transfer speed, where R is the resistence value of the resistence 141 and C is the capacitance of the capacitor 142. For example, when R=1MΩ and the data transfer speed is 4.7 μs, C will be set to a value larger than 4.7 pF.

Now, a case where the data changes from 1 to 0 will be considered. This case can be regarded as equal to a case where the reference voltage to be input to the first regulator circuit 1121 decreases by dV. Therefore, the maximum value of VDD, or the output from the first regulator circuit 1121 immediately after the data change is represented as (Vmax−dV). The value of VDD returns from (Vmax−dV) to Vmax with time.

The waveform in the above case is shown in FIG. 9C. The modulation/demodulation circuit 113 includes a differentiating circuit which converts the VDD signal into a differential signal. It is then possible to detect the change of data from 0 to 1 or from 1 to 0 by obtaining the differential signal (pulse signal) and latching the obtained pulse signal. With this construction, it is possible to judge whether the received data is 0 or 1 even if the voltage VDDH has become overvoltage. FIG. 9D shows the waveform of the differential signal.

Note that the second regulator circuit 917 of the conventional technique may be used as the second regulator circuit 116 of the present embodiment since there is no fear of misjudging the data even in the state of overvoltage.

As described above, the contactless IC card 100 of the present embodiment allows the VDDH output terminal 127 to generate a high voltage of over 4V mainly to drive the nonvolatile memory 115 and also allows the VDDL output terminal 128 to generate a low voltage of approximately 2V to drive the logic circuit 114, and this is achieved with a very simple construction due to the power supply circuit using the two-voltage rectifier circuit.

The contactless IC card 100 of the present embodiment has neither the step-up circuit nor the step-down circuit which consumes such a kind of power as is directly not related to the circuit operation of the contactless IC card 100. It is therefore possible to use all the power supplied from the reader/writer for the operation of the contactless IC card 100. This stabilizes the ordinary operation. In addition, this assures the stable operation of the contactless IC card 100 even if the card is relatively distant from the reader/writer, which extends the distance between the reader/writer and the contactless IC card 100 with which they can communicate with each other.

The contactless IC card 100 of the present embodiment can also detect the change of the data contained in the ASK-modulated signal from 0 to 1 or from 1 to 0 even if the voltage output from the power supply circuit 111 is overvoltage. This prevents the misjudgement of the received data.

<Embodiment 2>

The second embodiment of the present invention will be described. The contactless IC card of Embodiment 2 differs from Embodiment 1 in the construction of the power supply circuit 111. The following description will be centered on the difference, and common components will not be explained in detail.

Figure 10:
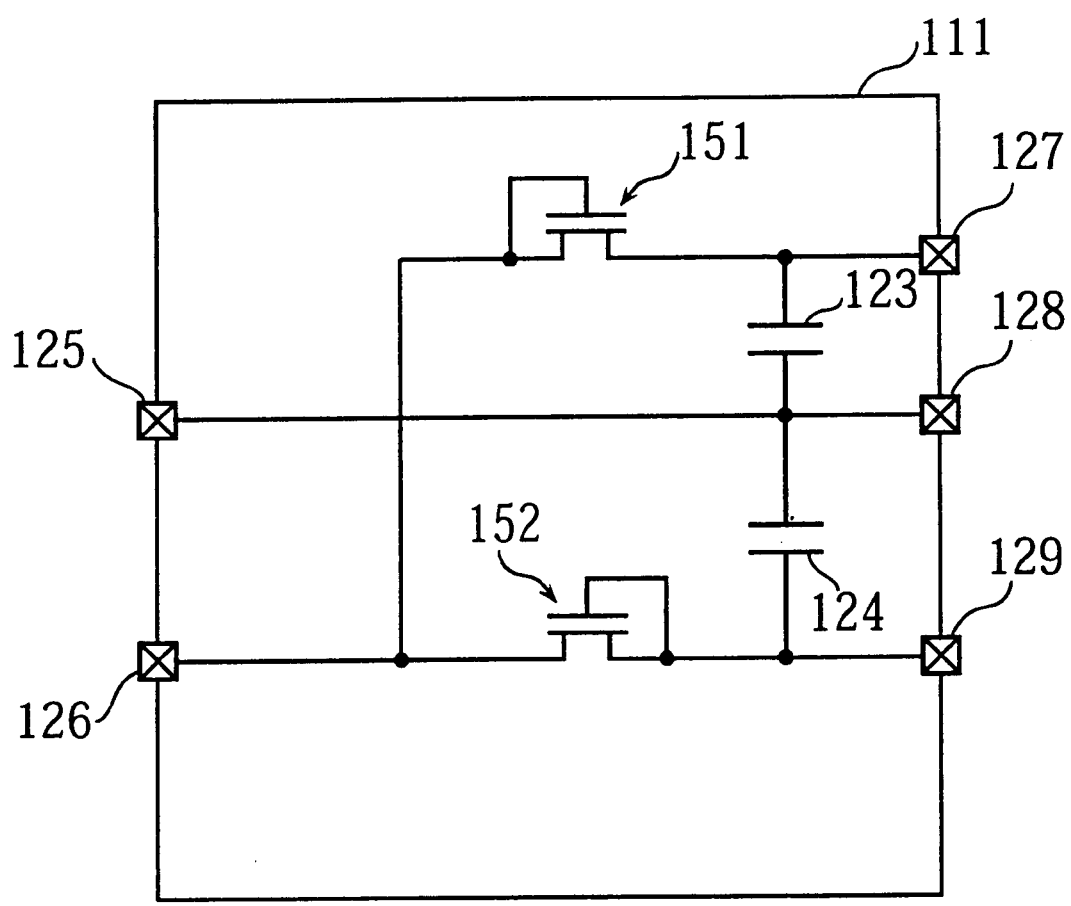
FIG. 10 shows the construction of the power supply circuit 111 in Embodiment 2.

FIG. 10 shows the construction of the power supply circuit 111 in the present embodiment. As shown in the drawing, while two diodes 121 and 122 for rectification are used in the power supply circuit 111 of Embodiment 1, in the power supply circuit 111 of Embodiment 2, N-channel MOS transistors 151 and 152 are used as the devices for rectification.

The source and the drain of the N-channel MOS transistor 151 are connected to the terminal 126 and the VDDH output terminal 127, respectively, and its gate is connected to the terminal 126. The source and the drain of the N-channel MOS transistor 152 are connected to the terminals 126 and 129, respectively, and its gate is connected to the terminal 129. With this construction, the power supply circuit 111 of Embodiment 2 operates in the same way as that of Embodiment 1 shown in FIG. 6.

The semiconductor integrated circuit of the present invention is typically manufactured with the CMOS process. Accordingly, it is more advantageous to use MOS transistors, as in the present embodiment, than to use diodes 121 and 122 shown FIG. 6 in terms of the cost, circuit area, and processes since the MOS transistors are formed at the same time the CMOS gate circuit is formed.

<Embodiment 3>

The third embodiment of the present invention will be described. The contactless IC card of Embodiment 3 also differs from Embodiment 1 in the construction of the power supply circuit 111. The following description will be centered on the difference, and common components will not be explained in detail.

Figure 11:
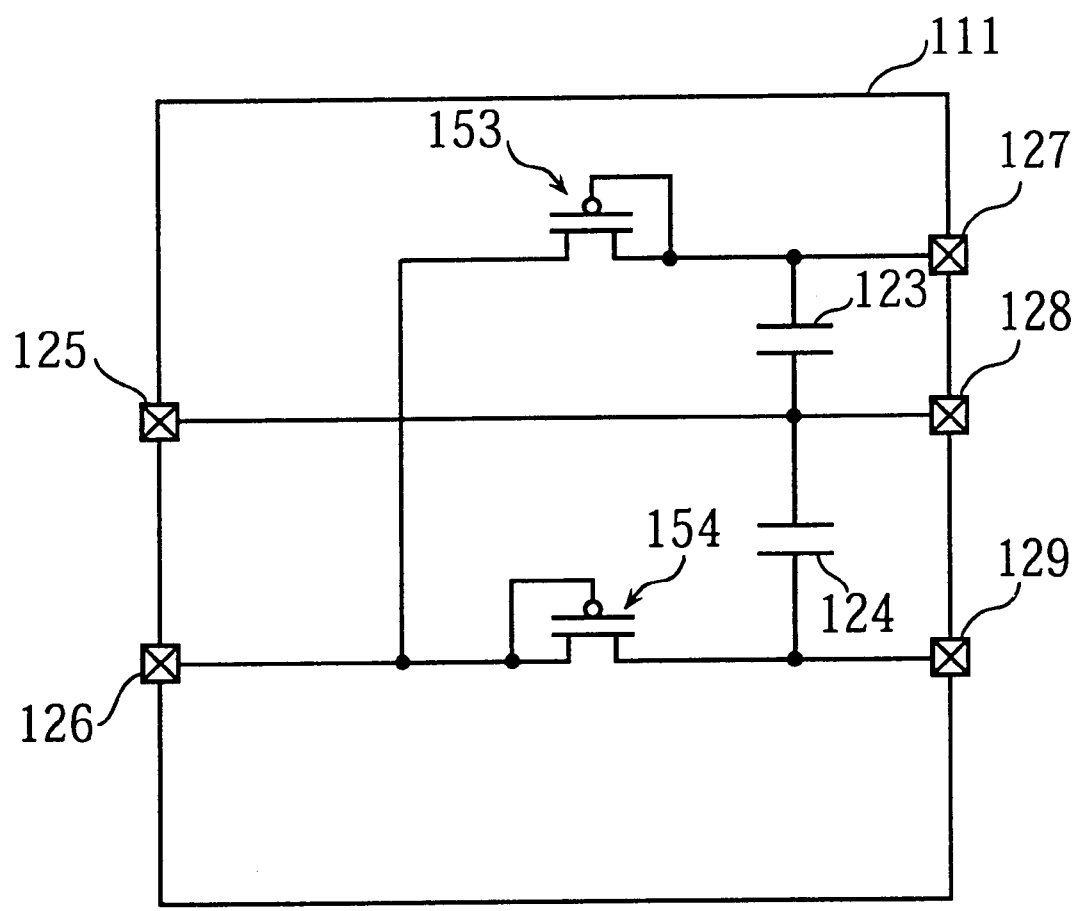
FIG. 11 shows the construction of the power supply circuit 111 in Embodiment 3.

FIG. 11 shows the construction of the power supply circuit 111 in the present embodiment. As shown in the drawing, P-channel MOS transistors 153 and 154 are used as the devices for rectification in the power supply circuit 111 of Embodiment 3. The source and the drain of the P-channel MOS transistor 153 are connected to the terminal 126 and the VDDH output terminal 127, respectively, and its gate is connected to the VDDH output terminal 127. The source and the drain of the P-channel MOS transistor 154 are connected to the terminals 126 and 129, respectively, and its gate is connected to the terminal 126. With this construction, the power supply circuit 111 of Embodiment 3 operates in the same way as that of Embodiment 1 or 2.

It is expected that the semiconductor integrated circuit of the present invention is manufactured using the p-type substrate, which can be prepared at a low cost, as the semiconductor substrate. In this case, when N-channel MOS transistors are used for rectification, the current passing through the P-well when the voltage at the terminal 126 has decreased to be lower than the voltage at the terminal 129 ripples through the entire substrate.

In contrast, when P-channel MOS transistors are used for rectification as in the present embodiment, the current that flows when the voltage at the terminal 126 has decreased to be lower than the voltage at the terminal 129 stops in the N-well. This provides an effect of stabilizing the overall operation of the semiconductor integrated circuit.

As described above, in Embodiments 2 and 3, two N-channel MOS transistors and two P-channel MOS transistors are used respectively as the devices for rectification used in the two-voltage rectifier circuit in the power supply circuit 111. Needless to say, a combined use of various types of devices for rectification including a diode for rectification is also possible. For example, the operation described above can be obtained by using an N-channel MOS transistor and a P-channel MOS transistor as the two devices for rectification.

<Embodiment 4>

The fourth embodiment of the present invention will be described. To operate a circuit stably, it is generally preferable that the power supply voltage changes little. The present embodiment therefore shows a method of making the amount of change in voltage VDD small when voltage VDDH changes. The contactless IC card of Embodiment 4 differs from Embodiment 1 in the construction of the voltage regulator circuit 112. The following description will be centered on the difference, and common components will not be explained in detail.

Figure 12:
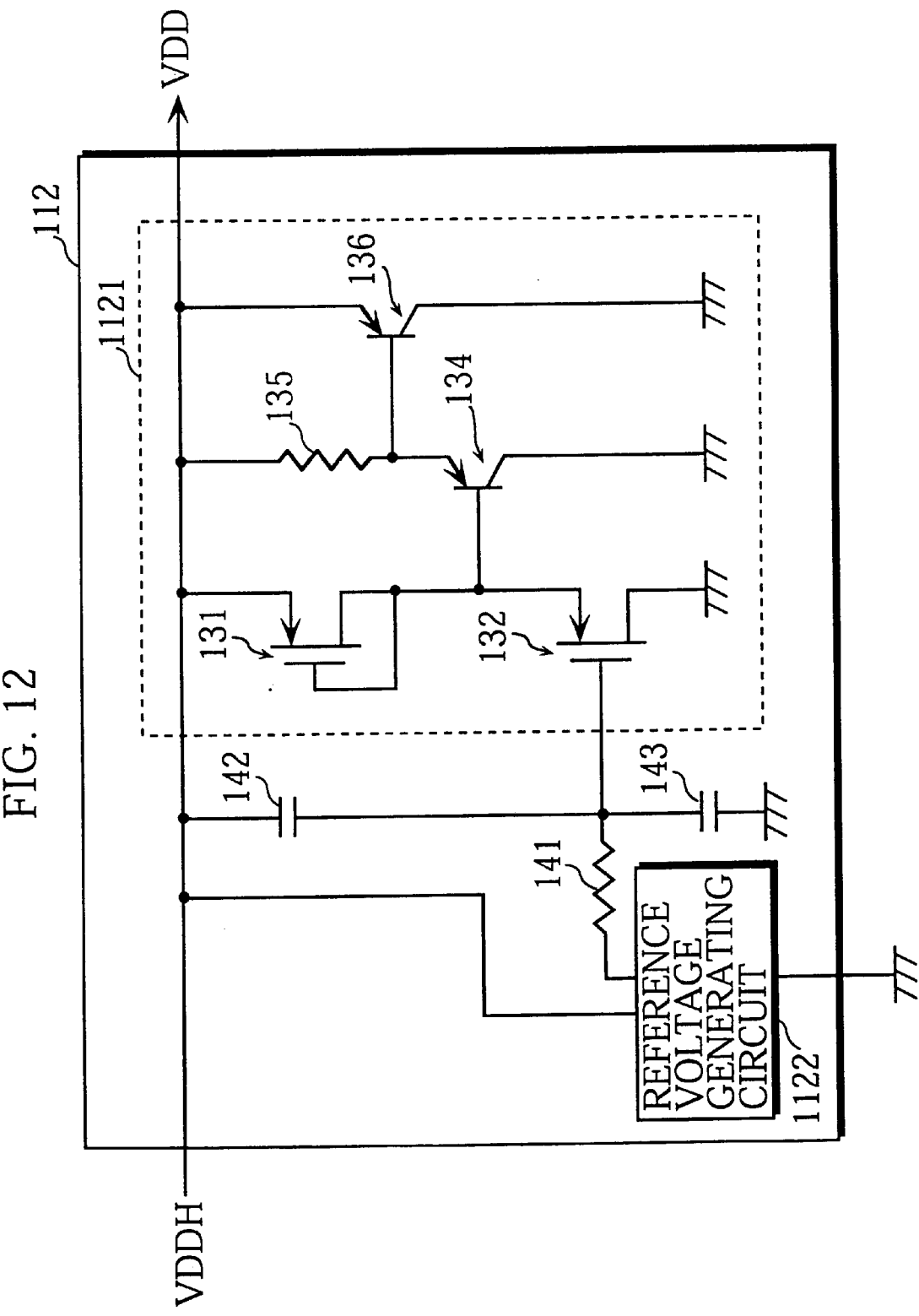
FIG. 12 shows the construction of the voltage regulator circuit 112 in Embodiment 4.

FIG. 12 shows the construction of the voltage regulator circuit 112 in the present embodiment, which differs from the same circuit 112 in Embodiment 1 in that a second capacitor 143 is disposed between the capacitor 142 and the ground. Here, when voltage VDDH changes by dV, the reference voltage output from the reference voltage generating circuit 1122 changes by $C1/(C1+C2) \times dV$, where C1 represents the capacitance of the first capacitor 142 and C2 represents the capacitance of the second capacitor 143. In this case, the maximum voltage of voltage VDD when voltage VDDH changes by dV is $Vmax \pm C1/(C1+C2) \times dV$. This indicates that the amount of change in voltage VDD, when voltage VDDH changes, is smaller than Embodiment 1.

<Embodiment 5>

The fifth embodiment of the present invention will be described. The present embodiment shows, as Embodiment 4, another method of making the amount of change in voltage VDD smaller when voltage VDDH changes. The contactless IC card of Embodiment 4 differs from Embodiment 1 also in the construction of the voltage regulator circuit 112. The following description will be centered on the difference, and common components will not be explained in detail.

Figure 13:
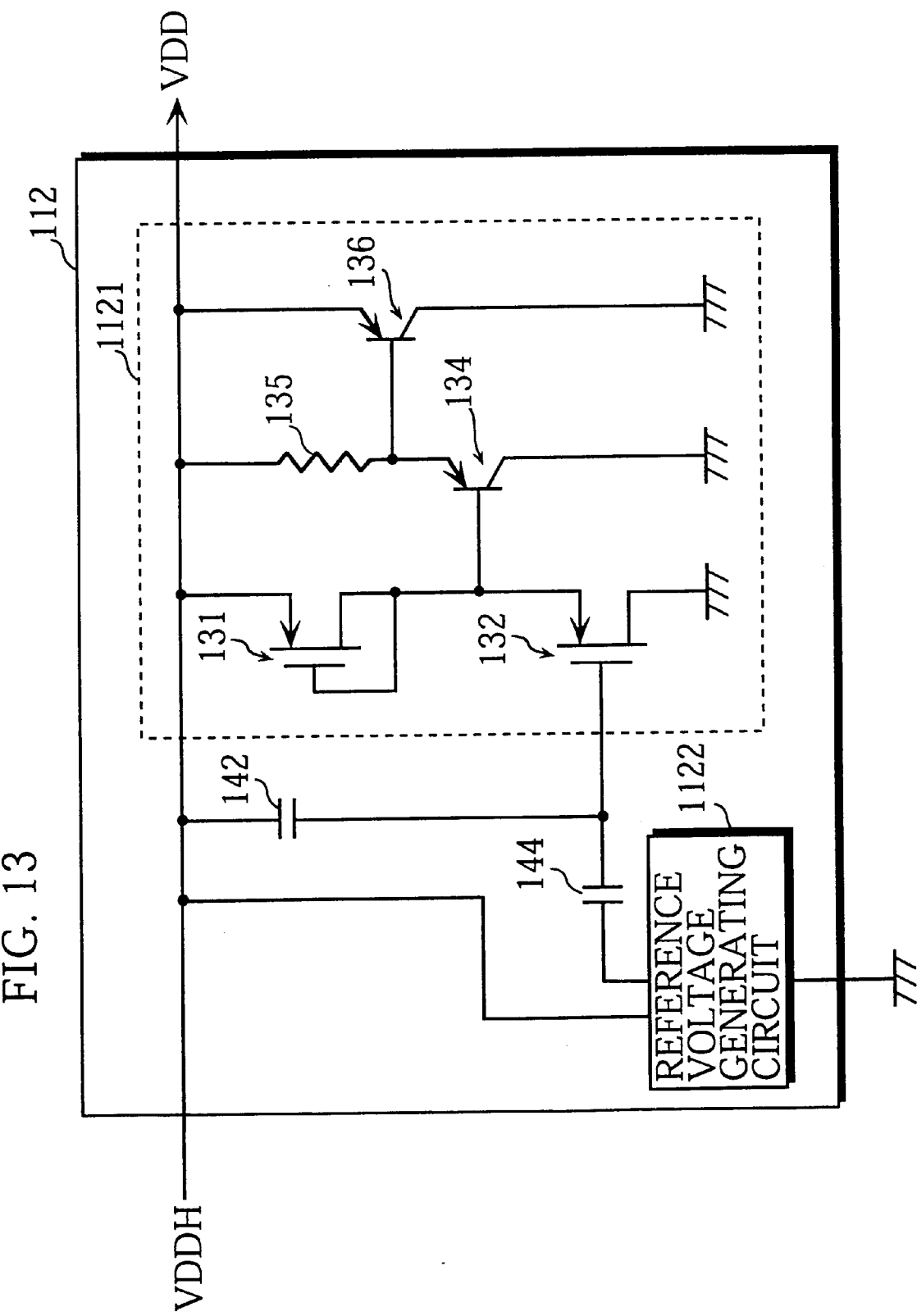
FIG. 13 shows the construction of the voltage regulator circuit 112 Embodiment 5.

FIG. 13 shows the construction of the voltage regulator circuit 112 in the present embodiment. As shown in the drawing, capacitors 142 and 144 are disposed in series between the output of the reference voltage generating circuit 1122 and the output of the power supply circuit 111, and a node disposed between the two capacitors is connected to the input of the regulator circuit 1121. Here, the voltage input to the regulator circuit 1121 is $Vref+(VDDH-Vref) \times C1/(C1+C2)$ by capacitance division, where C1 represents the capacitance of the first capacitor 142 on a side of the power supply circuit 111 and C2 represents the capacitance of the second capacitor 144 on a side of the regulator circuit 1121. In this case, the voltage input to the regulator circuit 1121 as the reference voltage changes by $C1/(C1+C2) \times dV$ when voltage VDDH changes by dV. This indicates that this method is effective as Embodiment 4 in limiting the amount of change in voltage VDD.

<Embodiment 6>

Figure 14:
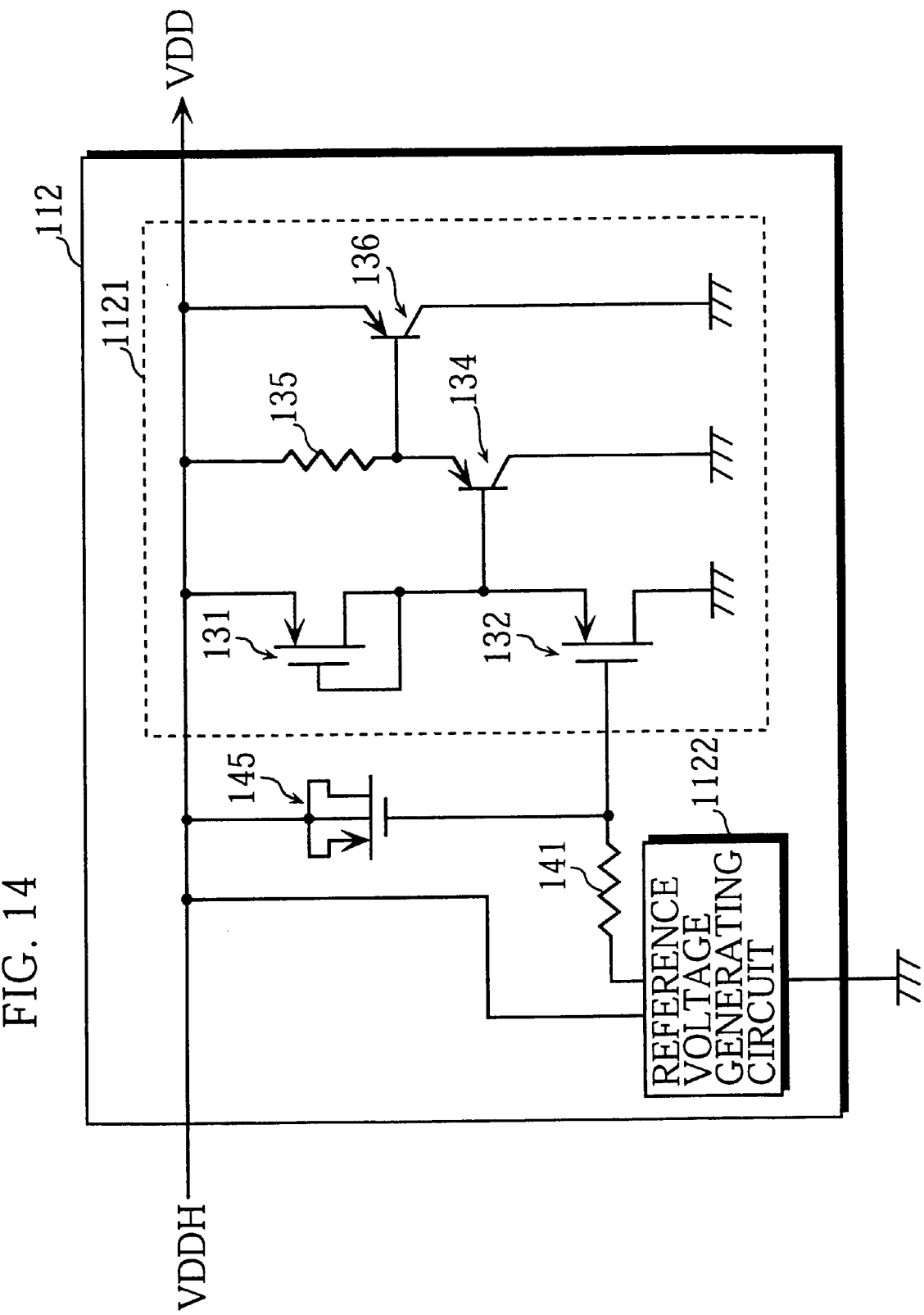
FIG. 14 shows the construction of the voltage regulator circuit 112 in Embodiment 6.

The sixth embodiment of the present invention will be described. FIG. 14 shows the construction of the voltage regulator circuit 112 in the present embodiment. As shown in the drawing, the present embodiment is characterized in that a PchMOS transistor 145 is disposed instead of the capacitor 142 of Embodiment 1. The gate of the PchMOS transistor 145 is connected to the input of the regulator circuit 1121 which receives the reference voltage from the reference voltage generating circuit 1122. The source, drain, and substrate of the PchMOS transistor 145 are connected to VDDH which is output from the power supply source 111.

The gate voltage of the PchMOS transistor 145 is lower than the voltage of the source, drain, or substrate. When the PchMOS transistor 145 is turned ON, it operates as a capacitor. With the above construction of the present embodiment, the capacitance at the gate of the MOS transistor can be used. This reduces the area of the capacitor. In other words, the cost can be reduced by reducing the area of the chip.

<Embodiment 7>

Figure 15:
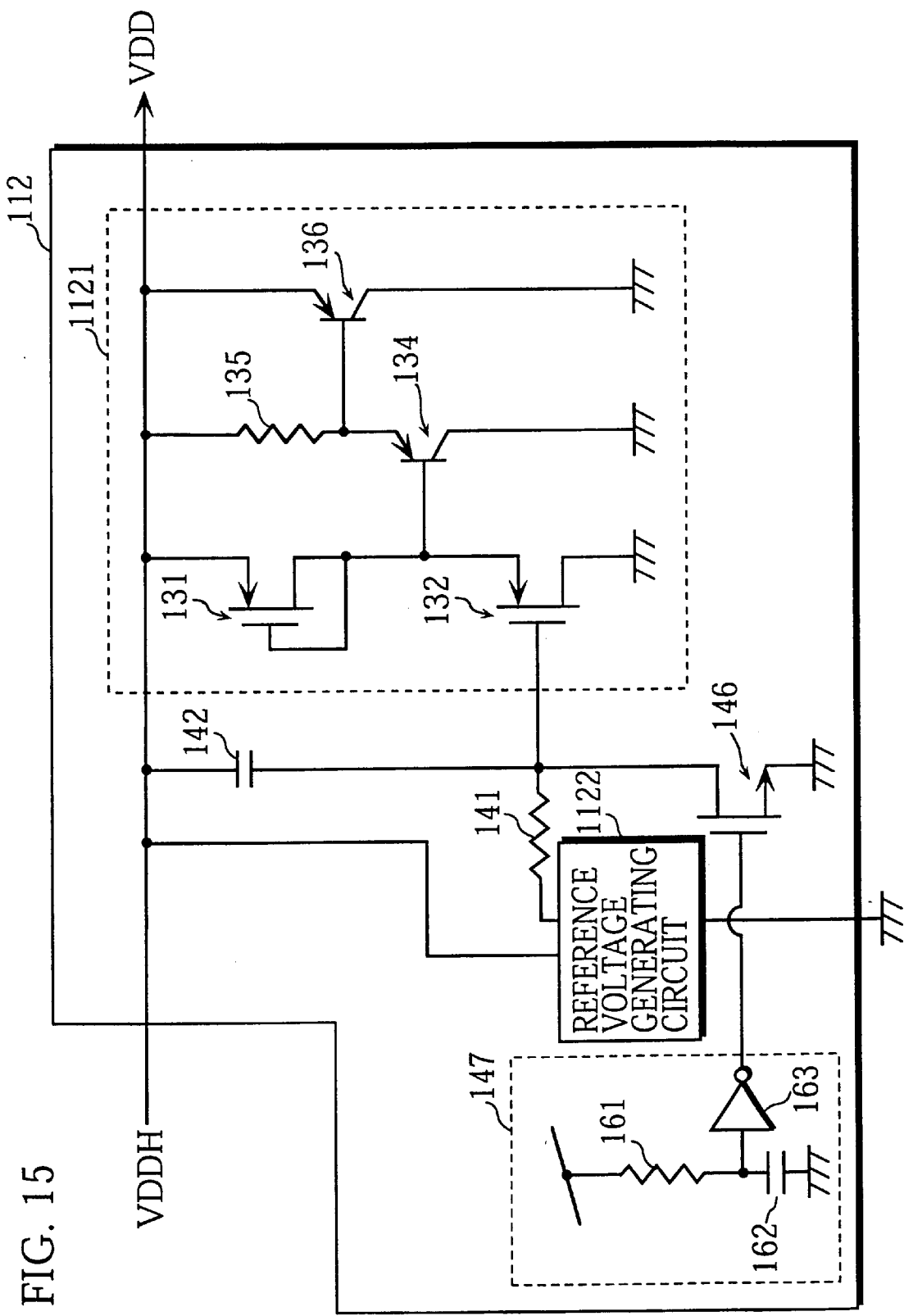
FIG. 15 shows the construction of the voltage regulator circuit 112 in Embodiment 7.

The seventh embodiment of the present invention will be described. The contactless IC card of Embodiment 7 differs from the other embodiments in the construction of the voltage regulator circuit 112. The following description will be centered on the difference, and common components will not be explained in detail. FIG. 15 shows the construction of the voltage regulator circuit 112 in the present embodiment. As shown in the drawing, an NchMOS transistor 146 is disposed between a node connected to the input of the regulator circuit 1121 and the ground. In addition, the gate of the NchMOS transistor 146 is connected to a power-on reset circuit 147. The power-on reset circuit 147 includes a resistor 161 disposed between the power supply (VDDH) and the ground, a capacitor 162, and an inverter device 163 whose input is connected to a node disposed between the resistor 161 and the capacitor 162. In the present embodiment, the power-on reset circuit 147 is connected to VDDH. However, it may be connected to VDDL.

The power-on reset circuit is provided, as in the present embodiment, so as to prevent the internal circuits of the contactless IC card 100 from being destroyed due to a drastic increase of the power supply voltage which is caused by the generation of the power supply voltage by the power supply circuit 111 (hereinafter referred to as "when the card is powered on") when the contactless IC card 100 approaches the reader/writer. The operation of the power-on reset circuit when the card is powered on will be described.

It is thought that the power supply voltage VDDH (or VDDL) often comes up rapidly when the card is powered on, though it may depend on the use of the contactless IC card 100. The voltage at the node disposed between the resistor 161 and the capacitor 162, however, does not increase until the capacitor 162 is charged. That is to say, since the capacitor 162 is charged via the resistor 161, it takes a certain amount of time before the capacitor 162 is charged. Accordingly, the inverter device 163 receives L immediately after the card is powered on, and receives H after the certain amount of time after the power on. From another point of view, the inverter device 163 outputs H immediately after the card is powered on, and outputs L after the certain amount of time after the power on.

The NchMOS transistor 146 is ON during the period after the capacitor 162 is charged and before the inverter device 163 starts outputting L. Under these circumstances, the reference voltage generating circuit 1122 in the present embodiment cannot generate an accurate reference voltage due to the instability immediately after the power on. On the other hand, the coupling is generated by the capacitor 142 even when the card is powered on. The voltage at the node connected to the input of the regulator circuit 1121 which receives the reference voltage, therefore, increases up to at least V when voltage VDDH increases from 0 to V.

In the above construction of the present embodiment, however, since the NchMOS transistor 146 is ON until the inverter device 163 starts outputting L, the electric current flows to the ground. This suppresses the increase of the reference voltage input to the regulator circuit 1121. This causes a difference between voltage VDDH and the reference voltage input to the regulator circuit 1121. When this happens, the regulator circuit 1121 is driven and it outputs voltage VDD by decreasing the received voltage VDDH. That is to say, the regulator circuit 1121 is driven immediately after the card is powered on even if the power supply voltage rapidly increases when the card is powered on. This construction enables the internal circuits of the contactless IC card 100 to be prevented from being destroyed due to a circulation of an overvoltage signal which is caused when the regulator circuit 1121 is not driven due to, for example, a drastic increase of the power supply voltage, which is caused by a drastic increase in the voltage of the signal output from the power supply circuit 111 due to a rapid approach of the contactless IC card 100 to the reader/write.

<Embodiment 8>

Figure 16:
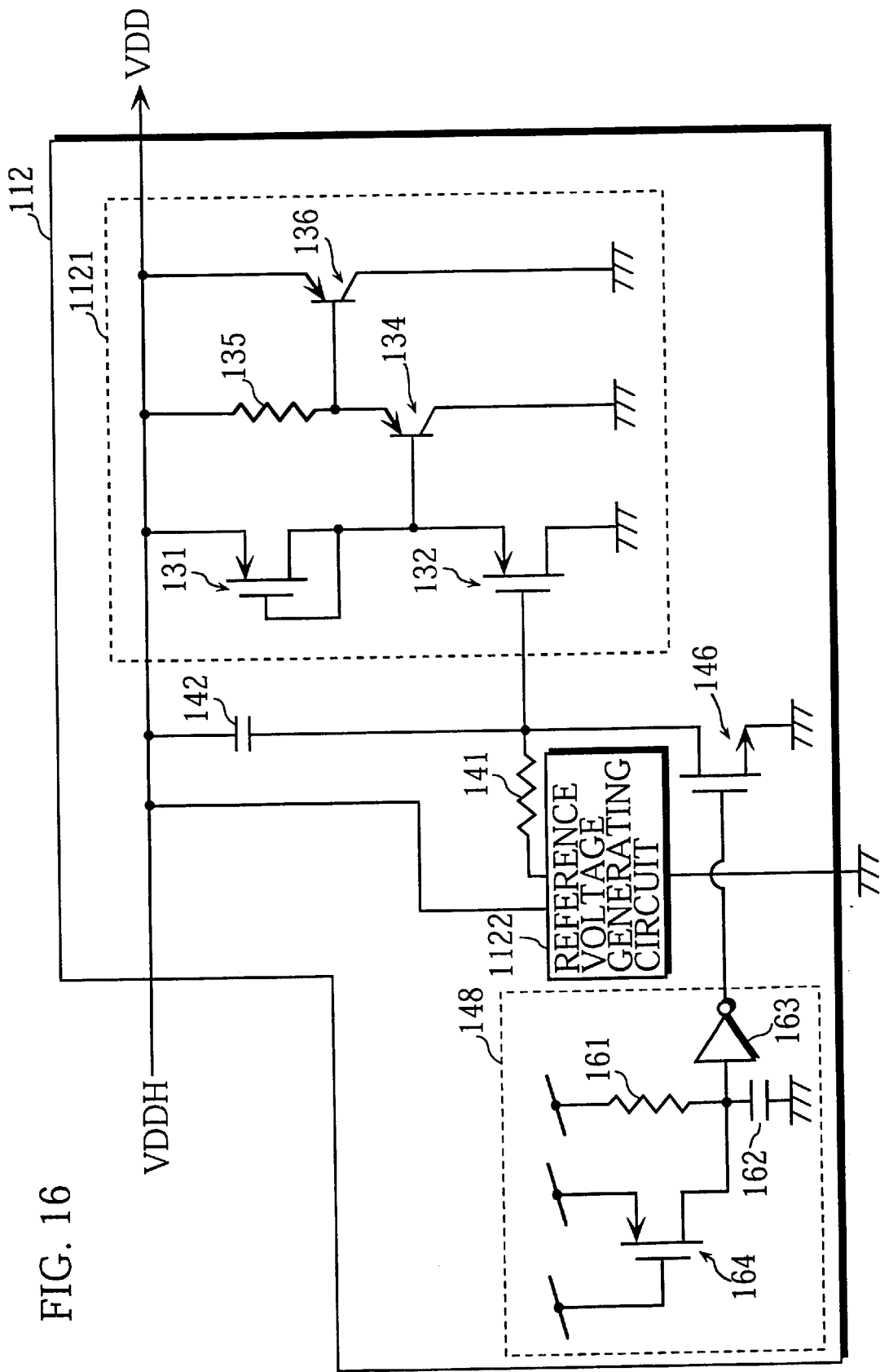
FIG. 16 shows the construction of the voltage regulator circuit 112 in Embodiment 8.

The eighth embodiment of the present invention will be described. The present embodiment is characterized by a modification of the power-on reset circuit 147 of Embodiment 7. The following description will be centered on the difference from Embodiment 7 and common components will not be explained in detail. FIG. 16 shows the construction of the voltage regulator circuit 112 in the present embodiment. As shown in the drawing, the power-on reset circuit 148 of the present embodiment includes a resistor 161 and a PchMOS transistor 164 disposed in parallel. The operation of the power-on reset circuit 148 will be described.

When the card is first powered on, the PchMOS transistor 164 is not driven, resulting in the same operation as Embodiment 7. The following is description of a case in which the power-on and off are performed in a very short time period. The above case happens, for example, (1) when the contactless IC card 100 leaves the reader/writer and soon approaches it again; or (2) when communication of radio waves between the reader/writer and the IC card is intercepted by some material and is soon recovered. In these cases, the capacitor 162 which has been charged at the first power-on is discharged via the resistor 161. As described in Embodiment 7, however, to prevent the internal circuit from destruction at the power-on, it is generally preferable that the resistance value of the resistor 161 is not so small. As a result, it takes a certain amount of time to discharge the capacitor 162 via the resistor 161.

Under the above circumstances, it may happen that the capacitor 162 is still charged when the card is powered on immediately after it is once powered off. In this case, the inverter device 163 receives H and outputs L at the second power-on. This makes the NchMOS transistor 146 turn off at the second power-on.

On the other hand, at the second power-on, the coupling is generated again by the capacitor 142, and the voltage input to the regulator circuit 1121 as the reference voltage increases to the power supply voltage. When this happens, the regulator 1121 stops operating since the NchMOS transistor 146 is OFF, and the voltage input to the regulator circuit 1121 as the reference voltage becomes equal to the power supply voltage.

In the present embodiment, when the card is powered off, the PchMOS transistor 164 is turned on. This enables the capacitor 162 to be discharged quickly. Therefore, even if the card is powered on immediately after it is once powered off, the inverter device 163 can receive L in a more assured manner. This enables the NchMOS transistor 146 to be ON by allowing the inverter device 163 to output H when the card is powered on the second time. As a result, the regulator circuit 1121 is driven since the difference between voltage VDDH and the voltage input to the regulator circuit 1121 as the reference voltage is caused even if the coupling is generated by the capacitor 142.

VARIATIONS

Up to now, various embodiments of the present invention have been described. However, the present invention is not limited to these embodiments. The present invention can be varied as follows, for example.

(1) In the semiconductor integrated circuit of the present invention, the regulator circuit 1121 and the reference voltage generating circuit 1122 are not limited to the constructions described above. More specifically, the regulator circuit 1121 is composed of PchMOS transistors and PNP-type bipolar transistors in the above embodiments, though it may be composed of only bipolar transistors or only MOS transistors. Any regulator circuit of a type in which the maximum output voltage value is determined in accordance with the input reference voltage can be applied to the present invention.

(2) Any circuit of a type in which a constant reference voltage is generated even if the power supply voltage (VDDH) changes can be applied to the present invention as the reference voltage generating circuit 1122. For example, the regulator circuit 1121 with any construction shown in the above embodiments can be used as the reference voltage generating circuit 1122 by connecting the reference voltage to the ground and disposing a constant-current circuit on a side of the power supply.

(3) The format of the capacitors is explained in Embodiment 6 using PchMOS transistors. However, capacitors of other formats such as ferroelectric capacitors or interphase capacitance may be used. In the present embodiments, the power-on reset circuit is driven only after the card is powered on (i.e., by controlling it by time). However, the power-on reset circuit may be driven only when the power supply voltage is lower than a certain voltage value (i.e., by controlling it by voltage value).

(4) In the above embodiments, a two-voltage rectifier circuit is used as the power supply circuit 111. This construction provides effects of using effectively the power supplied from the reader/writer in the form of a radio wave, preventing malfunctions due to a long distance between the reader/writer and the contactless information medium, and extending the distance between them with which they can communicate with each other. However, the power supply circuit 111 is not limited to this construction and may be a full-wave rectification circuit as conventionally used.

(5) In Embodiments 2 and 3, various constructions of the power supply circuit 111 are described. In Embodiments 4 to 8, various constructions of the voltage regulator circuit 112 are described. It is possible to combine any of these circuits properly to constitute the semiconductor integrated circuit.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A semiconductor integrated circuit comprising:
   a rectifier circuit which rectifies AC power to DC power;
   a regulator circuit which includes an input terminal for receiving the DC power, an output terminal, and a control terminal for receiving a reference voltage, and exercises control so that a voltage output from the output terminal does not exceed a voltage value determined from the reference voltage received by the control terminal; and
   a reference voltage changing circuit which changes the reference voltage received by the control terminal in correspondence to voltage change of the DC power.

2. The semiconductor integrated circuit of claim 1, wherein the reference voltage changing circuit includes:
   a reference voltage generation circuit which includes a reference voltage output terminal for outputting the reference voltage; and
   a CR time-constant circuit which includes a capacitor and a resistor connected in series, one end of the capacitor being connected to the input terminal and one end of the resistor being connected to the reference voltage output terminal, wherein
   the control terminal is connected to a node disposed between the capacitor and the resistor.

3. The semiconductor integrated circuit of claim 2, wherein
   the capacitor is a MOS transistor, wherein
   a source, a drain, and a substrate of the MOS transistor are connected to the input terminal, and a gate of the MOS transistor is connected to a node disposed between the resistor and the control terminal.

4. The semiconductor integrated circuit of claim 2, wherein the reference voltage changing circuit further includes:
   a second capacitor connected at one end to the control terminal and at another end to a ground line.

5. The semiconductor integrated circuit of claim 1, wherein the reference changing circuit includes:
   a reference voltage generation circuit which includes a reference voltage output terminal for outputting the reference voltage;
   a first capacitor connected at one end to the input terminal; and
   a second capacitor connected at one end to the reference voltage output terminal and connected at another end to another end of the first capacitor, wherein
   the control terminal is connected to a node disposed between the first capacitor and the second capacitor.

6. The semiconductor integrated circuit of claim 2 further comprising:
   a power-on reset circuit whose output changes from a first output level to a second output level a predetermined time after the rectifier circuit starts outputting the DC power; and
   a switching device which has at least a first terminal, a second terminal, and a third terminal, the first terminal being connected to an output terminal of the power-on reset circuit, the second terminal being connected to a ground line, and the third terminal being connected to the control terminal, and allows current to flow between the second terminal and the third terminal when the output of the power-on reset circuit is the first output level, and prevents current from flowing between the second terminal and the third terminal when the output of the power-on reset circuit is the second output level.

7. The semiconductor integrated circuit of claim 6, wherein the switching device is a MOS transistor.

8. The semiconductor integrated circuit of claim 6, wherein the power-on reset circuit includes:

a second capacitor connected at one end to the ground line;

an inverter device whose output is the first output level from after the rectifier circuit starts outputting the DC power until the second capacitor has been charged and is the second output level after the second capacitor has been charged.

9. The semiconductor integrated circuit of claim 8, wherein the power-on reset circuit further includes:

an impedance device connected at one end to a node disposed between the second capacitor and an input terminal of the inverter device and connected at another end to an output terminal of the rectifier circuit that outputs the DC power;

a switching device connected at one end to a node disposed between the second capacitor and an input terminal of the inverter device and allows current to flow through itself when the rectifier circuit stops outputting the DC power, allowing the second capacitor to discharge.

10. The semiconductor integrated circuit of claim 1 further comprising:

a differentiating circuit which differentiates an output from an output terminal of the regulator circuit and outputs a differential signal; and a detecting means which detects a change in a voltage value of the DC power in accordance with the differential signal.

11. The semiconductor integrated circuit of claim 1, wherein the rectifier circuit is a two-voltage rectifier circuit which outputs two DC power supplies with different voltage values in parallel.

12. The semiconductor integrated circuit of claim 11, wherein the input terminal receives a DC power supply with a higher voltage value out of the two DC power supplies output from the two-voltage rectifier circuit.

13. A contactless information medium comprising:

a power generation circuit which receives an ASK-modulated carrier from outside the contactless information medium and generates AC power;

a rectifier circuit which rectifies the AC power generated by the power generation circuit to DC power;

a reference voltage generation circuit which outputs a reference voltage;

a regulator circuit which includes an input terminal for receiving the DC power, a control terminal, and an output terminal, regulates the DC power so as not to exceed a voltage value determined from a voltage value received by the control terminal, and outputs the regulated DC power from the output terminal; and a reference voltage changing circuit which changes the reference voltage in correspondence to voltage change of the DC power, the changed reference being input to the control terminal.

14. The contactless information medium of claim 13 further comprising:

a differentiating circuit which differentiates an output from the output terminal; and a detecting circuit which detects a change in a voltage value of the DC power output from the differentiating circuit.

15. The contactless information medium of claim 14, wherein the rectifier circuit is a two-voltage rectifier circuit which rectifies the AC power and outputs two DC power supplies with different voltage values in parallel.

16. The contactless information medium of claim 14 used as a contactless IC card which receives an ASK-modulated carrier from a power supply source.

17. A method for driving a semiconductor integrated circuit which includes a regulator circuit for outputting DC power so as not to exceed a voltage value determined from a voltage value received by a control terminal, the method comprising:

a reception step in which a carrier having been ASK-modulated by digital data is received by an antenna coil;

a rectification step in which the carrier is received and AC power which is generated at two ends of the antenna coil is rectified; and a value discrimination step in which the digital data piggybacked on the carrier is discriminated by inputting the DC power into the regulator circuit and latching a pulse signal which is obtained by differentiating an output of the regulator circuit, wherein a value of a voltage input into the control terminal is changed in correspondence to voltage change of the DC power.

* * * * *

UNITED STATES PATENT AND TRADEMARK OFFICE
CERTIFICATE OF CORRECTION

PATENT NO.    : 6,659,352 B1
DATED         : December 9, 2003
INVENTOR(S)   : Hiroaki Asada et al.

It is certified that error appears in the above-identified patent and that said Letters Patent is hereby corrected as shown below:

<u>Title page,</u>
Item [56], References Cited, FOREIGN PATENT DOCUMENTS, please add the following references:
-- JP  55-2220    6/1953
   JP  57-113602  7/1982
   JP  63-58896   4/1988
   JP  4-252312   9/1992
   JP  6-4857     1/1994
   JP  8-204540   8/1996
   JP  8-335897   12/1996
   JP  9-331671   12/1997
   JP  10-201088  7/1998
   JP  10-210751  8/1998
   JP  10-222234  8/1998 --

Signed and Sealed this

First Day of June, 2004

JON W. DUDAS
*Acting Director of the United States Patent and Trademark Office*